(12) United States Patent
Lombardi

(10) Patent No.: US 9,168,648 B2
(45) Date of Patent: Oct. 27, 2015

(54) VIBRATION DAMPENED HAMMER

(71) Applicant: STANLEY BLACK & DECKER, INC., New Britain, CT (US)

(72) Inventor: Keith M. Lombardi, Avon, CT (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 242 days.

(21) Appl. No.: 13/715,690

(22) Filed: Dec. 14, 2012

(65) Prior Publication Data

US 2014/0165787 A1    Jun. 19, 2014

(51) Int. Cl.
| | | |
|---|---|---|
| B25D 1/12 | (2006.01) | |
| B25G 1/02 | (2006.01) | |
| B32B 37/24 | (2006.01) | |

(52) U.S. Cl.
CPC .. B25D 1/12 (2013.01); B25G 1/02 (2013.01); B32B 37/24 (2013.01)

(58) Field of Classification Search
CPC .............. B25D 1/00; B25D 1/12; B25G 1/01; B25G 1/02; B32B 37/14; B32B 37/24
USPC .................................................. 81/19, 20, 22
See application file for complete search history.

(56) References Cited

U.S. PATENT DOCUMENTS

| | | |
|---|---|---|
| 1,890,506 A | 12/1932 | Frank et al. |
| 2,140,209 A | 12/1938 | Rietveld |
| 3,577,637 A | 5/1971 | Braginetz |
| 3,593,417 A | 7/1971 | West et al. |
| 3,792,725 A | 2/1974 | Burgeson |
| 3,833,037 A * | 9/1974 | Fish ................................. 81/20 |
| 4,361,926 A | 12/1982 | Brush et al. |
| 4,517,741 A | 5/1985 | Castelluzzo |
| 4,586,256 A | 5/1986 | Weimann |
| 4,663,845 A | 5/1987 | Weimann |
| 4,862,590 A | 9/1989 | Winyard et al. |
| 4,930,218 A | 6/1990 | Jacoff |
| 5,086,562 A | 2/1992 | Jacoff |
| 5,101,564 A | 4/1992 | Melter |
| 5,144,749 A | 9/1992 | Chen |
| 5,259,274 A | 11/1993 | Hreha |
| 5,299,355 A | 4/1994 | Boda et al. |
| 5,301,428 A | 4/1994 | Wilcox |
| 5,311,664 A | 5/1994 | Abdul |
| 5,581,890 A | 12/1996 | Schmidt |

(Continued)

FOREIGN PATENT DOCUMENTS

| | | | |
|---|---|---|---|
| DE | 197 17 830 A1 | 10/1998 | |
| FR | 2 585 979 A1 | 2/1987 | |

*Primary Examiner* — Hadi Shakeri
(74) *Attorney, Agent, or Firm* — Pillsbury Winthrop Shaw Pittman LLP

(57) ABSTRACT

A hammer that includes a handle and a head is provided. The head disposed on an upper end of the handle. The handle includes a core member; a rigid material layer molded on the core member; and a grip member molded on at least a portion of the rigid material layer. The grip member includes a first elastomeric material layer molded on the rigid material layer and a second elastomeric material molded on the first elastomeric material layer. The head has an eye portion extending through the head. The handle has at least a portion of its upper end extending into the eye portion. An epoxy resin material is positioned within the eye portion and is at least partially disposed between the handle and the head to secure the handle to the head. An elastomeric portion is at least partially disposed between the handle and the head.

22 Claims, 28 Drawing Sheets

(56) References Cited

U.S. PATENT DOCUMENTS

| | | |
|---|---|---|
| 5,588,343 A | 12/1996 | Rust et al. |
| 5,653,449 A * | 8/1997 | Martin .................. 277/500 |
| 5,657,674 A | 8/1997 | Burnett |
| 5,797,188 A | 8/1998 | Gilbert |
| 5,896,788 A | 4/1999 | Hreha et al. |
| 5,911,795 A | 6/1999 | Tucker |
| 6,128,977 A * | 10/2000 | Gierer et al. .............. 81/22 |
| 6,158,307 A * | 12/2000 | Lamond et al. ............ 81/22 |
| 6,192,589 B1 | 2/2001 | Martone et al. |
| 6,311,369 B1 | 11/2001 | Ryu |
| 6,363,817 B1 | 4/2002 | Lamond et al. |
| 6,370,986 B1 | 4/2002 | Scott |
| 6,449,850 B1 | 9/2002 | Gilbert |
| 6,453,559 B1 | 9/2002 | Marshall et al. |
| 6,546,632 B2 | 4/2003 | Gilbert |
| 6,553,674 B1 | 4/2003 | Budrow |
| 6,574,872 B2 | 6/2003 | Roberts et al. |
| 6,718,639 B1 | 4/2004 | Kazanjian |
| 6,763,747 B1 | 7/2004 | Gierer et al. |
| 6,889,405 B2 | 5/2005 | Ritrovato et al. |
| 6,942,586 B2 | 9/2005 | Falone et al. |
| 6,971,178 B2 | 12/2005 | Rowlay |
| 7,066,052 B2 | 6/2006 | Chen |
| 7,296,354 B2 | 11/2007 | Van Deursen et al. |
| 7,703,355 B2 | 4/2010 | Halder et al. |
| 7,784,189 B2 | 8/2010 | Polei |
| 2003/0131426 A1 | 7/2003 | Schulling |
| 2003/0145686 A1 | 8/2003 | Schroder |
| 2004/0231475 A1 | 11/2004 | Cornfield et al. |
| 2006/0048389 A1 | 3/2006 | Votolato |
| 2008/0053278 A1 | 3/2008 | St. John et al. |
| 2008/0210059 A1 | 9/2008 | Adams et al. |
| 2010/0037467 A1 | 2/2010 | Rowlay et al. |
| 2011/0009211 A1 * | 1/2011 | Chao et al. ................ 473/342 |

* cited by examiner

SECTION A-A

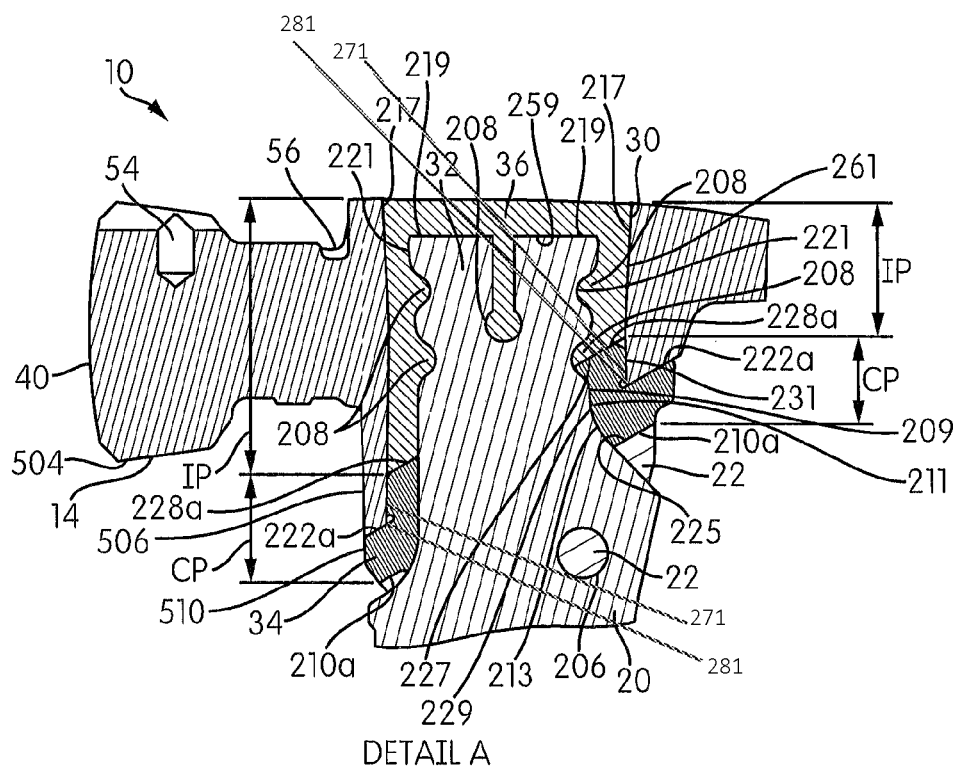
DETAIL A
FIG. 9
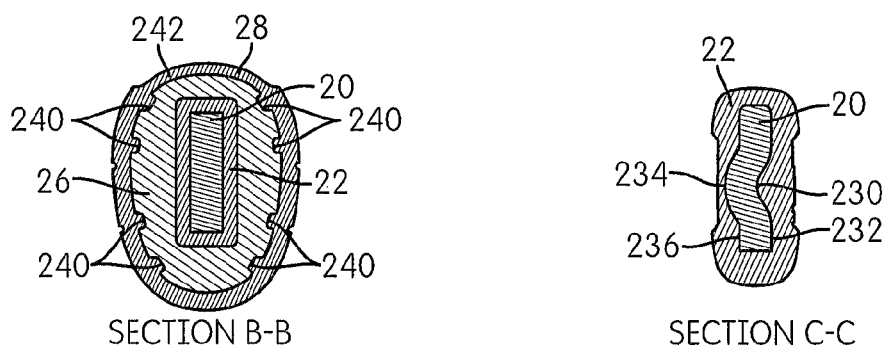
SECTION B-B
FIG. 10
SECTION C-C
FIG. 11

SECTION B-B

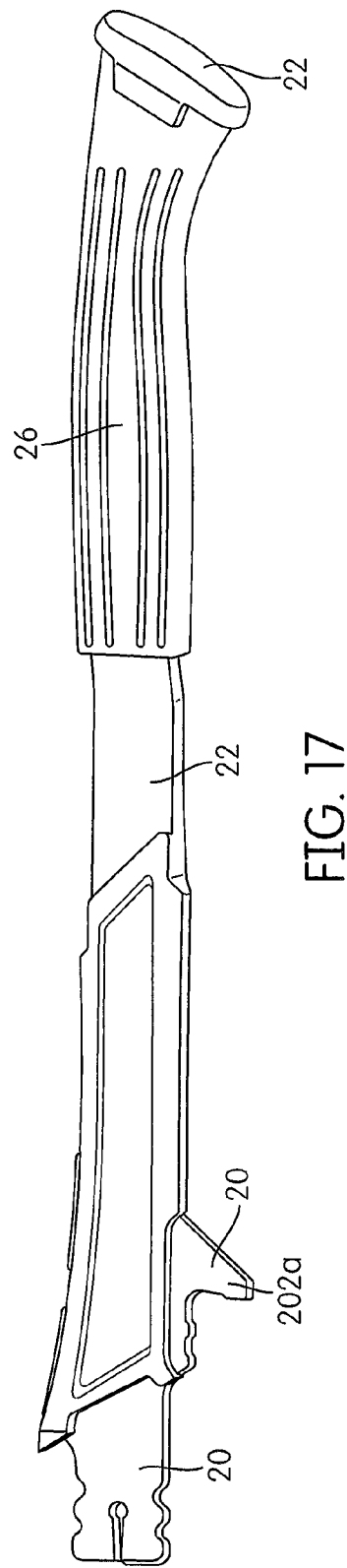

SECTION A-A

SECTION A-A

SECTION A-A

VIBRATION DAMPENED HAMMER

BACKGROUND OF THE APPLICATION

The present application relates to hammers and more particularly to a hammer having vibration dampening features.

Conventional hammers typically include a head secured to a handle. During use, a strike face disposed on the head of the hammer is configured to strike against an object, such as a nail or chisel.

SUMMARY OF THE APPLICATION

One aspect of the present application provides a hammer that includes a handle and a head. The handle has a bottom end and an upper end, and the head disposed is on the upper end of the handle. The handle and the head are separately formed structures. The handle includes a core member, a rigid material layer molded on the core member, and a grip member molded on at least a portion of the rigid material layer. The grip member includes a first elastomeric material layer molded on the rigid material layer and a second elastomeric material molded on the first elastomeric material layer. The first elastomeric material layer is a different material from the second elastomeric material layer. The rigid material layer has a Shore D durometer of about 65 to about 90. The first elastomeric material layer has a Shore A durometer of about 20 to about 60 and the second elastomeric material layer has a Shore A durometer of about 60 to about 80.

Another aspect of the present application provides a hammer that includes a handle, a head, an elastomeric portion, and an epoxy resin material. The handle has a bottom end and an upper end. The head is disposed on the upper end of the handle and has an eye portion extending through the head. The handle has at least a portion of its upper end extending into the eye portion. The epoxy resin material is positioned within the eye portion and is at least partially disposed between the handle and the head to secure the handle to the head. The elastomeric portion is at least partially disposed between the handle and the head.

Yet another aspect of the present application provides a method for making a hammer. The hammer has a handle and a head disposed on an upper end of the handle. The method includes providing a core member of the handle; overmolding a rigid material layer on the core member, the rigid material having a Shore D durometer of about 65 to about 90; overmolding a grip member on at least a portion of the rigid material layer, wherein the grip member comprises a first elastomeric material layer molded on the rigid material layer and a second elastomeric material molded on the first elastomeric material layer, wherein the first elastomeric material layer is a different material from the second elastomeric material layer, wherein the first elastomeric material layer having a Shore A durometer of about 20 to about 60 and the second elastomeric material layer having a Shore A durometer of about 60 to about 80; overmolding an elastomeric portion on at least a portion of the core member, wherein the elastomeric portion is at least partially disposed between the handle and head; and providing an epoxy resin material that is positioned within an eye portion extending through the head, the epoxy resin material being at least partially disposed in the eye portion between the handle and the head to secure the handle to the head.

These and other aspects of the present application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the application, the structural components illustrated herein are drawn to scale. It is to be expressly understood, however, that the drawings are for the purpose of illustration and description only and are not intended as a definition of the limits of the application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIG. 9 is a detailed view of an upper portion of the hammer of FIG. 8 in accordance with an embodiment of the present application;

FIG. 10 is a sectional view of the hammer along the line B—B of FIG. 5 in accordance with an embodiment of the present application;

FIG. 11 is a sectional view of the hammer along the line C—C of FIG. 5 in accordance with an embodiment of the present application;

FIG. 17 shows a left hand side elevational view of the core member with the rigid material layer and a first elastomeric material layer overmolded thereon in accordance with an embodiment of the present application;

DETAILED DESCRIPTION OF THE APPLICATION

Figure 1:
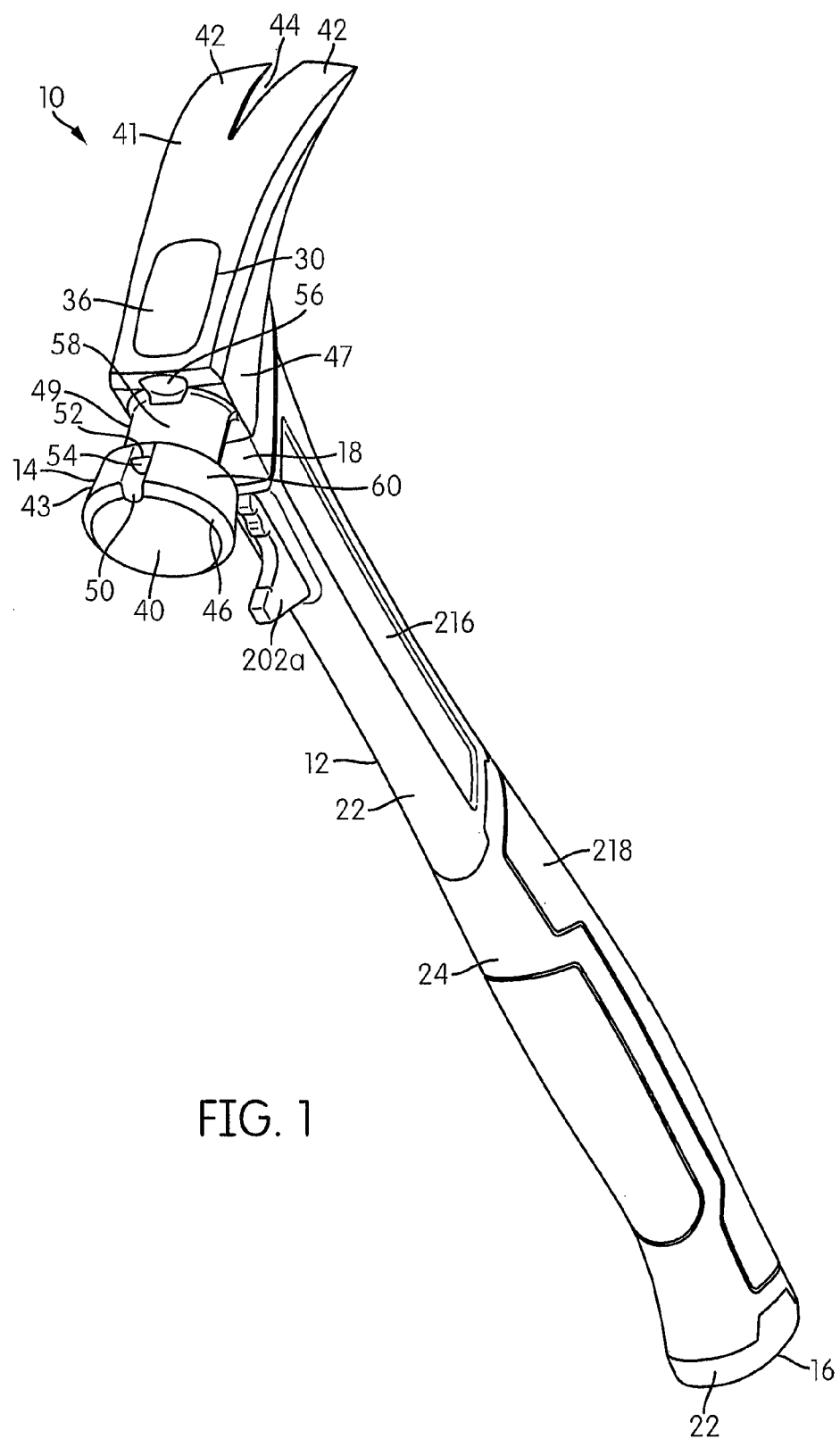
FIG. 1 is a perspective view of a hammer in accordance with an embodiment of the present application.

FIGS. 1-7 show different views of a hammer 10 in accordance with an embodiment of the present application. The hammer 10 includes a handle 12 and a head 14. The handle 12 has a bottom end 16 and an upper end 18. The head 14 is disposed on the upper end 18 of the handle 12. The handle 12 and the head 14 are separately formed structures.

Referring to FIGS. 8, 9, 10 and 11, the handle 12 includes a core member 20, a rigid material layer 22 molded on the core member 20, and a grip member 24 molded on at least a portion of the rigid material layer 22. The grip member 24 includes a first elastomeric material layer 26 molded on the rigid material layer 22 and a second elastomeric material 28 molded on the first elastomeric material layer 26. The first elastomeric material layer 26 is a different material from the second elastomeric material layer 28. In one embodiment, the rigid material layer has a Shore D durometer of about 65 to about 90, the first elastomeric material layer has a Shore A durometer of about 20 to about 60 and the second elastomeric material layer has a Shore A durometer of about 60 to about 80.

Referring to FIGS. 1, 6, 8 and 9, the head 14 has an eye portion 30 extending through the head 14. The handle 12 has at least a portion 32 of its upper end 18 extending into the eye portion 30. The hammer 10 includes an epoxy resin material 36 that is positioned within the eye portion 30 and is at least partially disposed between the handle 12 and the head 14 to secure the handle 12 to the head 14. The hammer 10 also includes an elastomeric portion 34 that is at least partially disposed between the handle 12 and the head 14.

In one embodiment, the head 14 of the hammer 10 is made of steel, iron, titanium, or other suitable metal material. In one embodiment, the head 14 of the hammer 10 is generally forged, cast or stamped. In one embodiment, the head 14 of the hammer is forged from a steel material.

As shown in FIGS. 1-7, the head 14 has a strike surface 40 at one end 43 thereof. The head 14 includes a bell 60 and a chamfer 46 disposed circumferentially along edges of the strike surface 40. The bell 60 tapers so as to be reducing in diameter as it extends away from the chamfer 46. The head 14 has a body portion 47 and a neck portion 49 that connects the bell 60 with the body portion 47 of the head 14.

Figure 2:
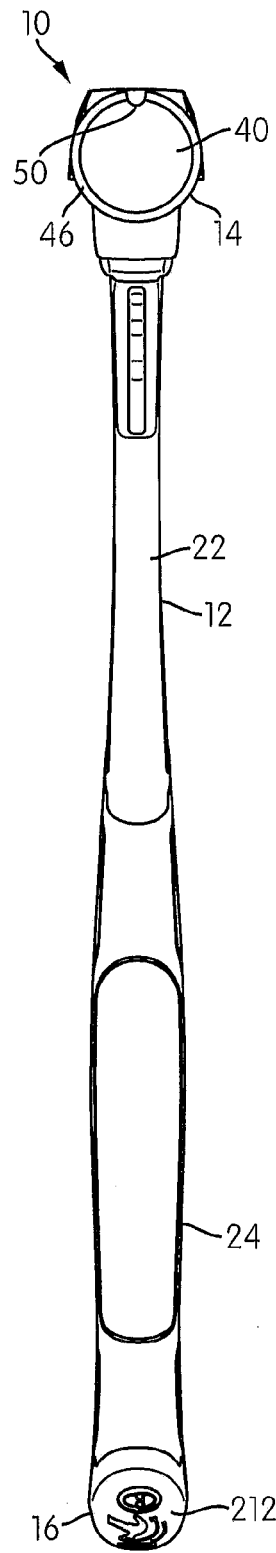
FIG. 2 is a front elevational view of the hammer in accordance with an embodiment of the present application.
Figure 3:
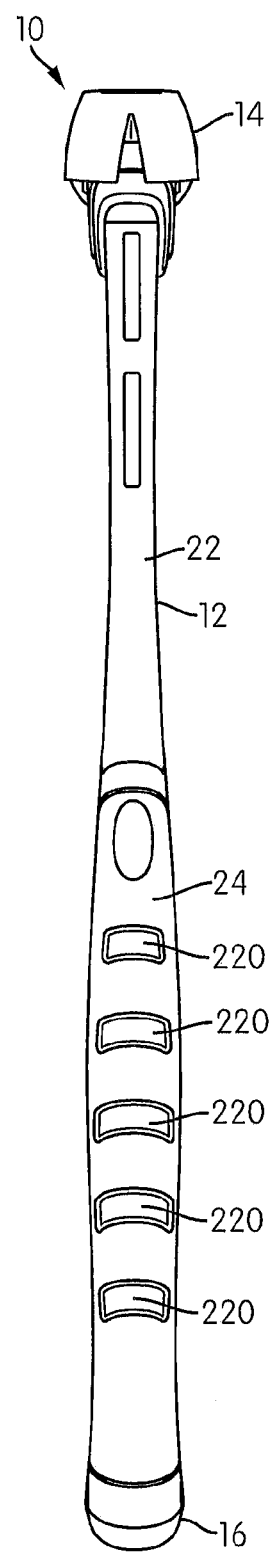
FIG. 3 is a rear elevational view of the hammer in accordance with an embodiment of the present application.

When the hammer 10 is swung in a swing plane of the hammer 10 (i.e., a plane, which, as viewed in FIG. 2, is perpendicular to the page and extends longitudinally through the center of the hammer 10), the striking surface 40 strikes an object, such as a nail or a chisel. In one embodiment, the strike surface 40 of the hammer 10 is slightly convex in order to facilitate square contact during driving of nails.

The head 14 also includes a pair of tapered, spaced-apart nail removing claws 42 that is positioned at the other end 41 (opposite to the end 43) of the head 14. In one embodiment, the nail removing claws 42 of the head 14 of the hammer 10 are spaced apart so as to provide a V-shaped space 44 therebetween. The shank of a nail can be received in the V-shaped space 44 with the top of the hammer 10 facing the work piece and the nail is removed by engaging the spaced apart claws 42 with the head of the nail and withdrawing the nail from a work piece. In some embodiments, no claw is provided (e.g., a ball peen hammer).

Figure 6:
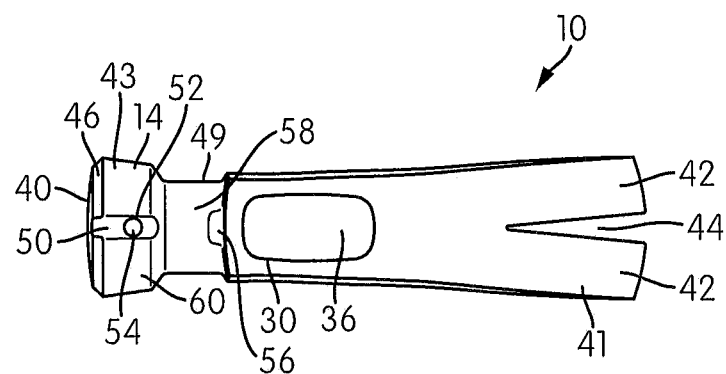
FIG. 6 is a top plan view of the hammer in accordance with an embodiment of the present application.

As shown in FIGS. 1, 2, and 6, a groove 50 is located along a top surface of the bell 60. The groove 50 is constructed and arranged to receive and retain a nail (not shown) therein, when the nail is placed in an initial nail driving position to facilitate the start of a nail driving operation. An opening 52 is located on a top surface of the bell 60. A magnet 54 is located in the opening or groove 52. The magnet 54 is constructed and arranged to help retain the nail in the initial nail driving position in the groove 52 to facilitate the start of the nail driving operation.

As shown in FIGS. 1, 6, 8 and 9, a notch 56 is disposed on the top surface of a portion that connects the neck portion 49 and the body portion 47. A surface 58 of the hammer 10 is constructed and arranged to support a head of the nail. Thus, the groove 50, the magnet 54, and the surface 58 act together to position and to initially drive the nail in a first blow into a work piece. The nail starter arrangement that includes the groove 50, magnet 54, and the surface 58 is optional.

The eye portion 30 is in the form of a hole, a bore or an opening through the head 14 that is constructed and arranged to receive at least a portion of the handle 12 therein so as to secure the handle 12 to the head 14. In one embodiment, as shown in the FIG. 9, the eye portion 30 includes circumferential inner surface(s) 217.

In one embodiment, as shown in the FIG. 9, a head and handle interface portion IP is disposed at the eye portion 30. As will be clear from the discussion below, during the assembly of the hammer 10, the epoxy resin material 36 is provided in the head and handle interface portion IP to secure the handle 12 to the head 14.

Figure 8:
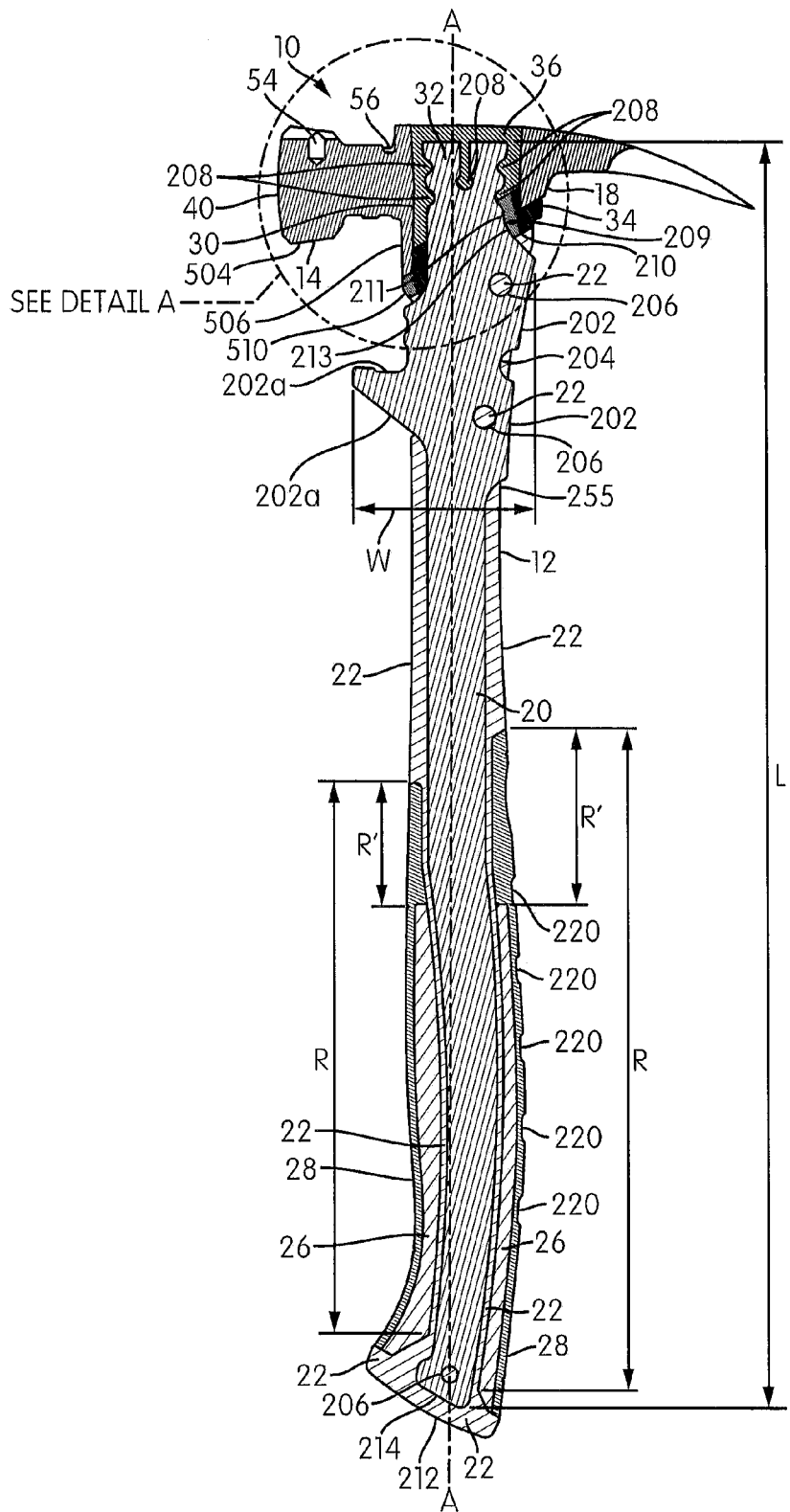
FIG. 8 is a left hand side sectional view of the hammer along the line A—A of FIG. 7 in accordance with an embodiment of the present application.

In one embodiment, as shown in FIG. 9, a bottom of the head 14 comprises a lower annular surface portion 222a joining with a lower portion 271 of the circumferential inner or interior surface 217. For example, in the embodiment illustrated in FIG. 9, the lower annular surface portion 222a is joined with the lower portion 271 of the circumferential inner surface 217 at region 281 depicted in the figure. In one embodiment, as shown in FIGS. 8 and 9, the lower annular surface portions 222a of the head 14 are slanted at an angle with respect to a longitudinal or central axis A—A of the hammer 10. In one embodiment, the lower annular surface portions 222a of the head 14 are slanting downwardly toward the hammer handle.

Also, in one embodiment, as shown in the FIG, 9, a head and handle compliant portion CP is at least partially disposed in the eye portion 30. Referring to FIG. 9, the head and handle compliant portion CP is flanked or surrounded by upper surface portions 210a of the rigid material layer 22 on its lower side 225, and is flanked or surrounded by the lower surface portions 222a of the head 14 and lower surface portions 228a of the epoxy resin material 36 on its upper side 227. This head and handle compliant portion CP surrounds the core member 20 so that the inner annular surface 229 contacts and adheres to the outer surface of the core member 20 and its outer surface 231 contacts and adheres to the circumferential inner surface 217.

In one embodiment, as shown in FIG. 9, the elastomeric portion 34 is constructed and arranged to engage with the lower annular surface portion 222a of the head 14. In one embodiment, as shown in FIG. 9, the elastomeric portion 34 is constructed and arranged to engage with entirety of the lower annular surface portion 222a of the head 14, for example, at a forward portion of the bottom surface 222a aligned with the head 14.

In one embodiment, as shown in FIG. 9, the rigid material layer 22 is formed between the core member 20 and an annular bottom surface (on the lower side 225) of the elastomeric portion 34.

In one embodiment, as shown in FIG. 9, the elastomeric portion 34 and the epoxy resin material 36 are in direct contact with each other in a manner such that the elastomeric portion 34 is flanked or surrounded by lower surface portions 228a of the epoxy resin material 36 on its upper side 227. In one embodiment, as shown in FIG. 9, the elastomeric portion 34 and the epoxy resin material 36 are in direct contact with the core member 20.

Referring to FIG. 9, the head and handle interface portion IP is flanked or surrounded by upper side surface portions 227 of the head and handle compliant portion CP or the elastomeric portion 34 on its lower side 228a. This head and handle interface portion IP surrounds the core member 20 so that its inner surface 259 contacts and adheres to outer surfaces 219 and 221 of the core member 20 and its outer surface 261 contacts and adheres to inner surfaces 217 of the head 14.

The handle 12 is specifically designed to dampen vibration that is transmitted to the user's hand through the handle 12. As noted above, referring to FIGS. 8, 9, 10 and 11, the handle 12 includes the core member 20, the rigid material layer 22 molded on the core member 20, and the grip member 24 molded on at least a portion of the rigid material layer 22.

In one embodiment, the core member 20 of the handle 12 is made from a fiberglass material or any other durable material. The core member 20 of the handle 12 is generally formed using a forging operation, stamping operation, casting operation, metal injection molding operation, injection molding operation, extrusion operation, or a pultruding operation.

The core member 20 of the handle 12 runs the entire length of the handle 12 and extends into the eye portion 30 of the hammer 10. As shown in FIG. 8, the core member 20 of the handle has a length dimension of L. In one embodiment, the length dimension of L is between approximately 10 inches to approximately 38 inches. In one embodiment, the length dimension of L is approximately 16 inches.

In one embodiment, the core member 20 of the handle has a maximum width dimension of W. In one embodiment, the maximum width dimension of W is between approximately 1.25 inches to approximately 2.5 inches. In one embodiment, the maximum width dimension of W is approximately 2.5 inches.

In one embodiment, the core member 20 of the handle 12 has shallow cuts or protrusions on each end thereof to provide a mechanical interface for the overmolded material (i.e., the rigid material layer 22 or the elastomeric portion 34). For example, as shown in FIG. 8, protrusions 202, cuts 204 and through holes 206 are provided on the core member 20. These protrusions 202, cuts 204, and through holes 206 enable a mechanical bond to be formed between the core member 20 and the rigid material layer 22 that is overmolded thereon. These protrusions 202, cuts 204, and through holes 206 provide interlocks for the rigid material layer 22 to take hold of the core member 20. For example, the through holes 206 allow the material of the rigid material layer 22 to flow/pass therethrough, while the protrusions 202 and cuts 204 allow the material of the rigid material layer 22 to form in the cuts 204. (The protrusions 202 are also constructed and arranged to provide protection against impact to the rigid material layer 22 when the hammer 10 is being used.

Figure 12:
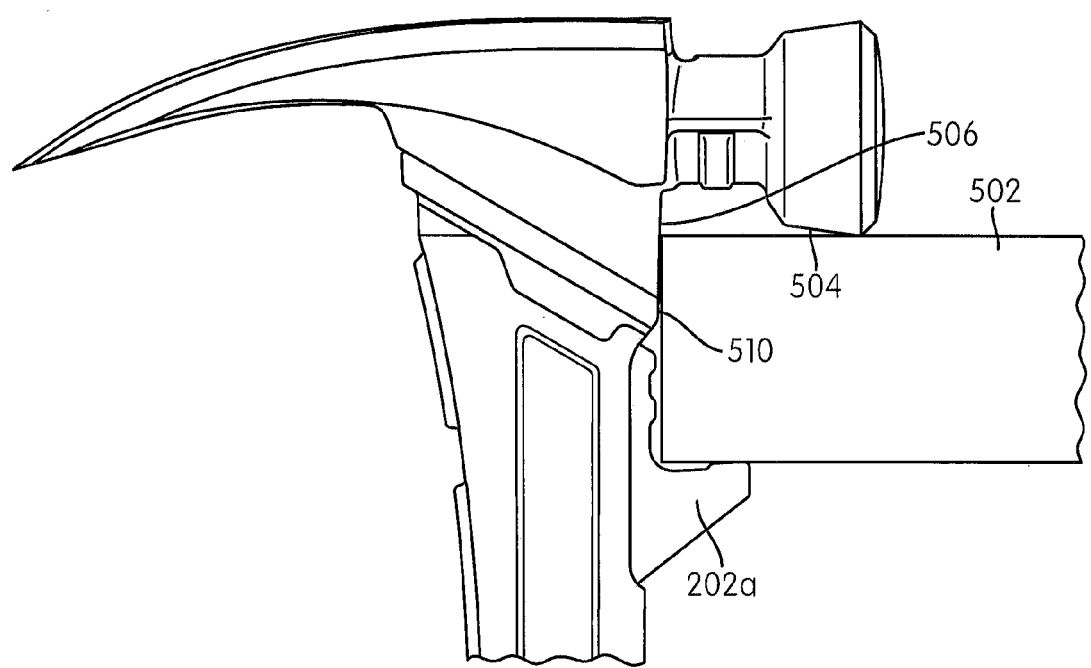
FIG. 12 is a partial right hand side view of the hammer, wherein a protruding portion of the core member acts a board grabber, in accordance with an embodiment of the present application.

The core member 20 also includes a protruding portion 202a. Referring to FIG. 12, the protruding portion 202a of the core member 20 is constructed and arranged to act as a board grabber that is used for manipulating, for example, construction lumber 502 (also referred to as 2× (two by) which is a reference to its thickness). In one embodiment, the actual thickness of 2× lumber is approximately 1.5 inches. As shown in the illustrated embodiment, the construction lumber 502, when being manipulated by the protruding portion 202a, is also supported by a lower surface 504 of the bell 60, a surface portion 506 of the head 14, and a surface portion 510 of the elastomeric portion 34.

Also, referring to FIGS. 8 and 9, additional cuts 208 are provided on the upper region of the core member 20. These cuts 208 enable a mechanical bond to be formed between the core member 20 and the epoxy resin material 36. These cuts 208 provide mechanical interlocks for the epoxy resin material 36 to take hold of the core member 20.

In another embodiment, self-bonding materials may be used instead to form an overmold on upper and lower regions of the core member 20. The material properties of these self-bonding materials enable a mechanical bond and/or a chemical bond to be formed between the core member 20 and the rigid material layer 22 or between the core member 20 and the elastomeric portion 34. In such an embodiment, shallow cuts or protrusions on the core member 20 may be optional. In another embodiment, both chemical and mechanical bonds/connects are provided.

In yet another embodiment, a primer or an adhesion promoting material may be used on the core member 20 before overmolding the material layer(s) thereon. This primer or adhesion promoting material applied on the core member 20 enables a mechanical bond and a chemical bond to be formed between the core member 20 and the rigid material layer 22 or between the core member 20 and the elastomeric portion 34. In such an embodiment, shallow cuts or protrusions on the core member 20 may be optional.

As shown in FIG. 10, the core member 20 of the handle 12 generally has a rectangular cross-sectional configuration. In one embodiment, as shown in FIGS. 4, 5, 8, and 11, the rectangular cross-section of the core member 20 may include a recessed portion 230 on one side 232 and a projection portion 234 on an opposite side 236 thereof at an upper central portion 255 of the core member 20. In one embodiment, the projection portion 234 on the opposite side 236 projects beyond the portion of rectangular cross-section by an amount corresponding to the depth of the undercut portion 230. The recessed portion 230 and projection portion 234 of the core member 20 enable a mechanical bond to be formed between the core member 20 and the rigid material layer 22 in the upper central portion 255 of the core member 20.

In one embodiment, the durable core member 20 of the handle 12 is surrounded by multiple layers of a soft rubber material, a hard rubber material and a high impact plastic material. In another embodiment, the durable core member 20 of the handle 12 is surrounded by multiple layers of a soft elastomeric material, a hard elastomeric material and a high impact plastic material. In this application, the terms "rubber" and "elastomeric" may be used interchangeably, unless otherwise prescribed.

In one embodiment, the entire length of the core member 20, except the core member 20 in the head and handle interface portion IP that is at the eye portion 30 and in the head and handle compliant portion CP that is at least partially disposed in the eye portion 30, is overmolded with the rigid material layer 22. In one embodiment, the entire length of the core member 20 of the handle 12, except a few inches at the eye end, is overmolded with the rigid material layer 22. In one embodiment, the rigid material layer 22 is not overmolded to approximately the last two inches of the core member 20 at the eye end.

The rigid material layer 22 is overmolded onto the core member 20 of the handle 12, for example, using an injection molding process. In one embodiment, the rigid material layer 22 that is overmolded onto the core member 20 of the handle 12 is made from a high impact plastic material. For example, the high impact plastic material may be a polypropylene material, an Acrylonitrile Butadiene Styrene (ABS) plastic material, a polystyrene material or Cellulose Acetate Butyrate (CAB). In one embodiment, the rigid material layer is a hard impact plastic material having a Shore D durometer of about 65 to about 90.

In one embodiment, the thickness of the rigid material layer 22 is variable along the length of the handle 12. For example, as shown in FIG. 8, the thickness of the rigid material layer 22 is reduced in a handle grip region R. This reduction in the thickness of the rigid material layer 22 in the handle grip region R enables multiple layers of a soft rubber material and a hard rubber material to be overmolded on the rigid material layer 22 without increasing the overall hammer handle thickness in the handle grip region R.

Figure 4:
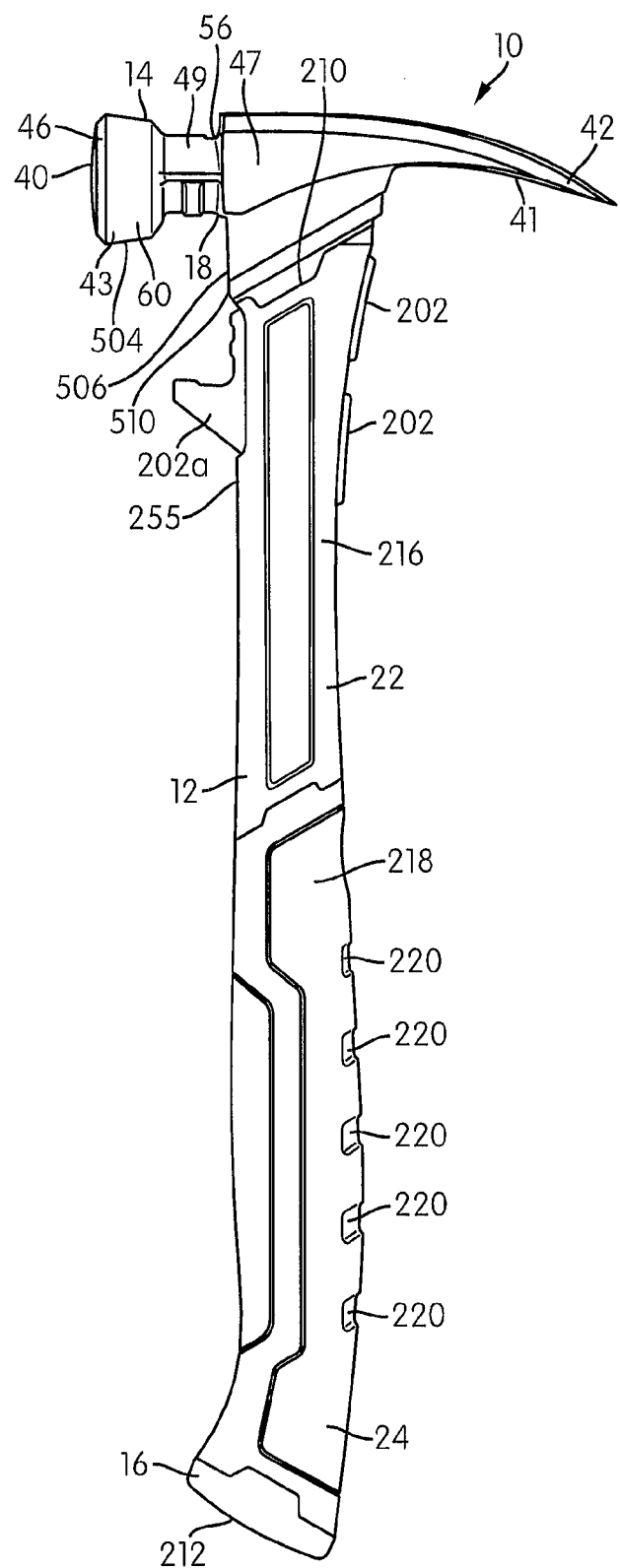
FIG. 4 is a left hand side elevational view of the hammer in accordance with an embodiment of the present application.
Figure 5:
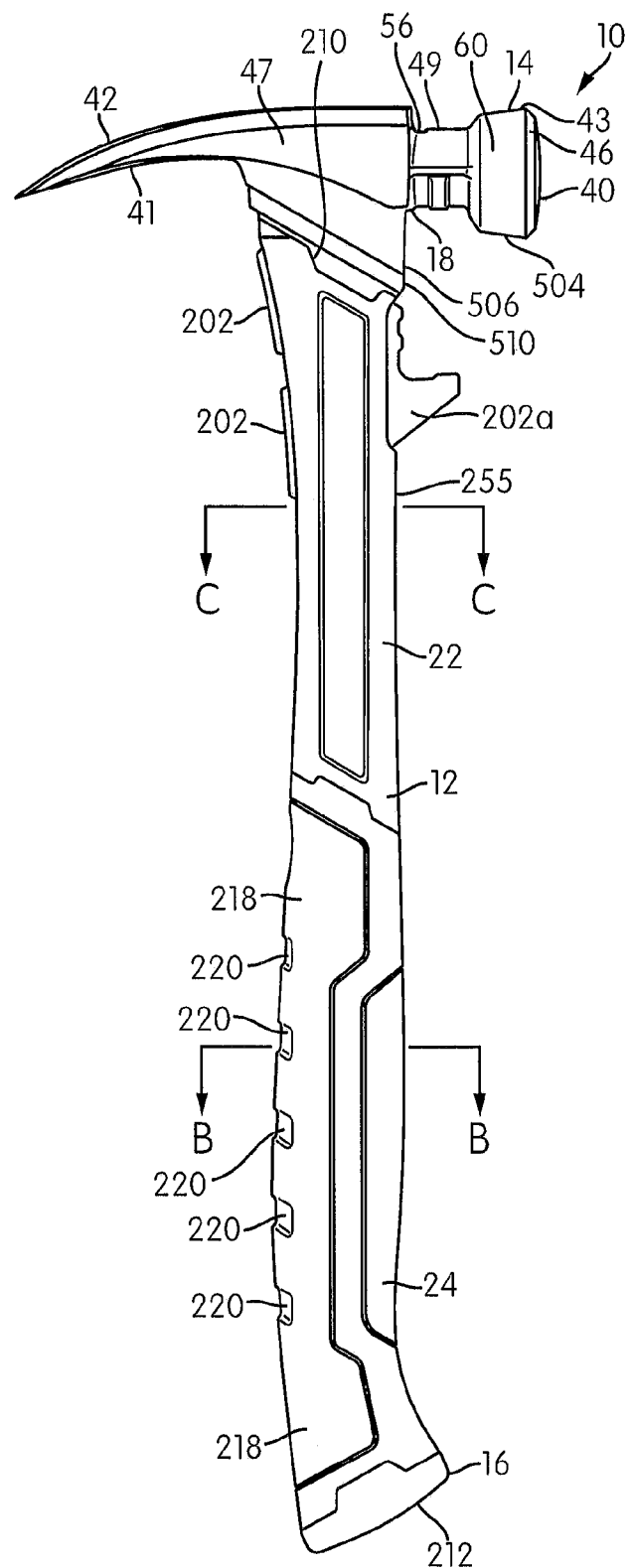
FIG. 5 is a right hand side elevational view of the hammer in accordance with an embodiment of the present application.

In one embodiment, as shown in FIGS. 4, 5, and 8, lower surface 212 of the rigid material layer 22 and lower surface 214 of the core material 20 are slanted at an angle with respect to the longitudinal or central axis A—A of the hammer 10. In one embodiment, the lower surface 212 of the rigid material layer 22 and the lower surface 214 of the core material 20 are both slanting downwardly away from the hammer.

In one embodiment, as shown in FIGS. 8 and 9, upper surface 210 of the rigid material layer 22 is slanted at an angle with respect to the longitudinal or central axis A—A of the hammer 10. In one embodiment, the upper surface 210 of the rigid material layer 22 is slanting upwardly toward the hammer head.

As noted above, the grip member 24 is molded on at least a portion of the rigid material layer 22. The grip member 24 includes the first elastomeric material layer 26 molded on the rigid material layer 22 and the second elastomeric material 28 molded on the first elastomeric material layer 26. The first elastomeric material layer 26 is a different material from the second elastomeric material layer 28.

In one embodiment, as shown in FIG. 8, the grip member 24 molded on the rigid material layer 22 in the handle grip region R. As shown in FIG. 8, in at least a portion R' of the handle grip region R, the second elastomeric material layer 28 is directly molded onto the rigid material layer 22.

In one embodiment, the first elastomeric material layer 26 is made from a soft rubber material having a Shore A durometer of about 30 to about 60. In one embodiment, the first elastomeric material layer 26 has a Shore A durometer of about 20 to about 50. In one embodiment, the first elastomeric material layer 26 is molded over the rigid material layer 22 using an injection molding process. In one embodiment, the soft rubber material of the first elastomeric material layer 26 is constructed and arranged to chemically and permanently bond to the high impact plastic material of the rigid material layer 22. In one embodiment, the soft rubber material of the first elastomeric material layer 26 is constructed and arranged to reduce the vibration transmitted through the hammer head 14, into the handle 12 and into the user's hand during the impact of the strike surface against the object, such as a nail or a chisel.

Referring to FIG. 10, the first elastomeric material layer 26 has a plurality of notches 240 disposed circumferentially around its surface 242. During the overmolding of the second elastomeric material layer 28 on the first elastomeric material layer 26, these notches 240 receive some material of the second elastomeric material layer 28 to form mechanical interlock regions for the second elastomeric material layer 28 to take hold of the first elastomeric material layer 26.

In one embodiment, the second elastomeric material layer 28 is made from a hard rubber material having a Shore A durometer of about 60 to about 80. In one embodiment, the second elastomeric material layer 28 is molded over the first elastomeric material layer 26 using an injection molding process. In one embodiment, the hard rubber material of the second elastomeric material layer 28 is constructed and arranged to chemically and permanently bond to the soft rubber material of the first elastomeric material layer 26. This hard rubber material of the second elastomeric material layer 28 not only helps reduce vibration but also provides wear resistance greater than the softer rubber material of the first elastomeric material layer 26 underneath it.

In one embodiment, as shown in FIGS. 4, 5 and 8, the second elastomeric material layer 28 forms a manually engageable gripping portion. Optionally, the second elastomeric material layer 28 can be ergonomically shaped. For example, a plurality of arcuate indentations 220 may be spaced longitudinally along a surface of the second elastomeric material layer 28.

The hammer 10 also includes the epoxy resin material 36 that is positioned within the eye portion 30 and is at least partially disposed between the handle 12 and the head 14 to secure the handle 12 to the head 14. In one embodiment, the epoxy resin material 36 is provided in the head and handle interface portion IP.

In one embodiment, the elastomeric portion 34 is constructed and arranged to cover at least half of the remaining portion of the core member 20 of the handle 12. The remaining portion herein refers to the portion of the core member 20 of the handle 12 that is not overmolded with the rigid material layer 22. In one embodiment, the elastomeric portion 34 has a Shore A durometer of about 60 to about 80 . In one embodiment, the elastomeric portion 34 is made from a hard rubber material having a Shore A durometer of about 50 to about 90. Referring to FIG. 9, the outer surface 231 of the elastomeric portion 34 forms a secure press fit with the eye portion 30 to avoid any leakage of the epoxy resin material 36 out the space between the eye portion 30 and the handle 12. That is, in one embodiment as shown in FIG. 9, the elastomeric portion 34 is constructed and arranged to engage with the inner surface 217 of the eye portion 30. In one embodiment, as shown in FIG. 9, the outer surface 231 of the elastomeric portion 34 is constructed and arranged to engage with the inner surface 217 of the eye portion 30.

This elastomeric portion 34 of the handle 12 serves two purposes. First, the elastomeric portion 34 is constructed and arranged to create a compliant interface between the handle end and the hammer eye portion 30.

In general, during the hammer construction or assembly, the handle end is typically pressed into the eye portion 30 of the hammer 10. The epoxy resin material 36 is then poured into the remaining eye cavity to secure the handle 12 to the head 14. Since the epoxy resin material 36 is a viscous material, it leaks out from the space between the eye portion 30 and the handle 12 unless a secure press fit or a gasket is installed. The hard rubber material of the elastomeric portion 34 that is molded onto the end of the handle 12 serves both as a complaint structure and a gasket member to prevent the epoxy resin material 36 from escaping.

Second, the elastomeric portion 34 is constructed and arranged to isolate the rigid handle core member 20 of the handle 12 from head 14 with the compliant layer or the interface and to reduce the amount of vibration transmitted from the head 14 to the handle 12.

In one embodiment, as shown in FIGS. 8 and 9, upper surface portions 228a and lower surface portions 225 of the elastomeric portion 34 are slanted at an angle with respect to the longitudinal or central axis A—A of the hammer 10. In one embodiment, the upper surface portions 228a and lower surface portions 225 of the elastomeric portion 34 are slanting downwardly toward the hammer handle.

Figure 7:
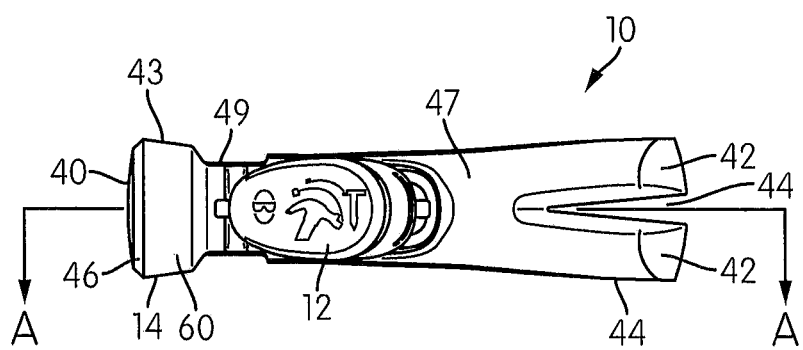
FIG. 7 is a bottom plan view of hammer in accordance with an embodiment of the present application.

In one embodiment, referring to FIGS. 2, 4, 5, and 7, a surface 218 of the second elastomeric material layer 28, surface 216 of the rigid material layer 22 and/or the bottom surface 212 of the rigid material layer 22 may have advertising or promotional information such as indicia (not shown) for identifying the product to the customers. In another embodiment, as shown in FIGS. 2 and 7, the bottom surface 212 of the rigid material layer 22 may contain indicia (not shown) such as instructions for using the hammer 10.

In one embodiment, the epoxy resin material 36 may be made from a chemically cured, two part epoxy resin used for applications including joining, laminating, and electrical/electronic insulation. In one embodiment, the cured epoxy resin has a Shore D durometer of about 60 to about 90.

The assembly of the hammer is shown and explained with respect to FIGS. 1-11.

Figure 13:
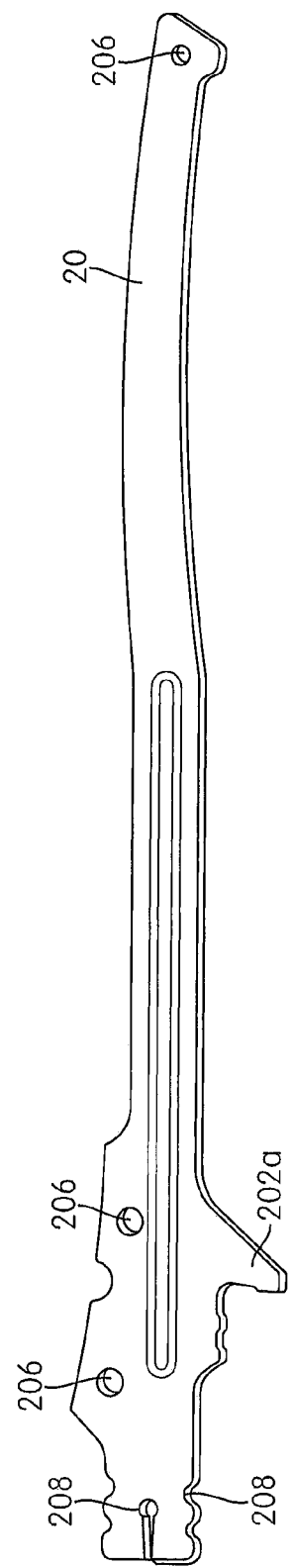
FIG. 13 shows a left hand side elevational view of a core member of an exemplary hammer in accordance with an embodiment of the present application.
Figure 14A:
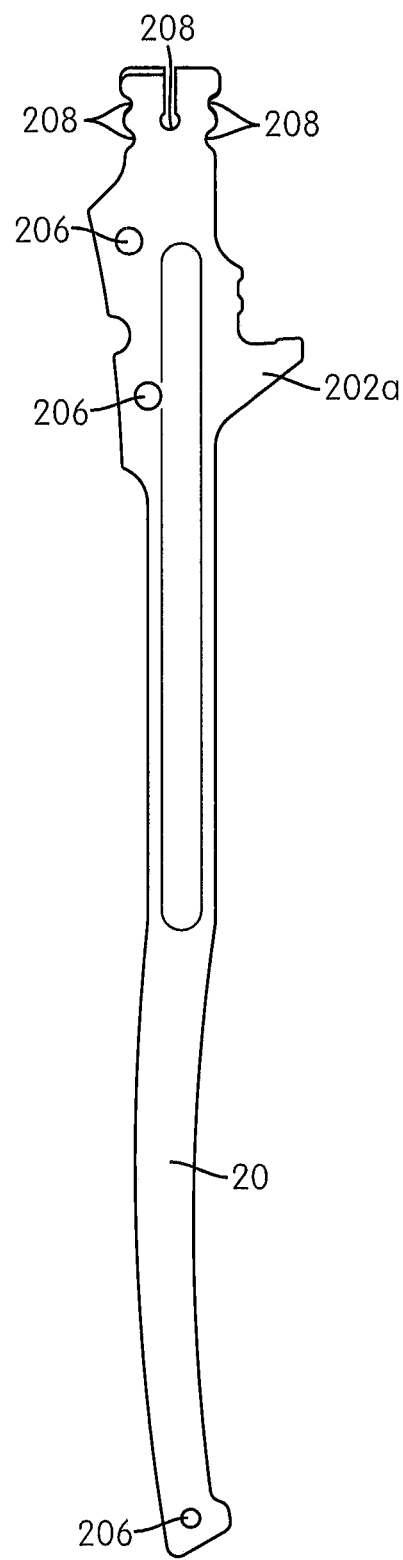
FIGS. 14A-E show various views of the core member of FIG. 13 showing portions and dimensions of the core member in accordance with an embodiment of the present application.
Figure 14B:
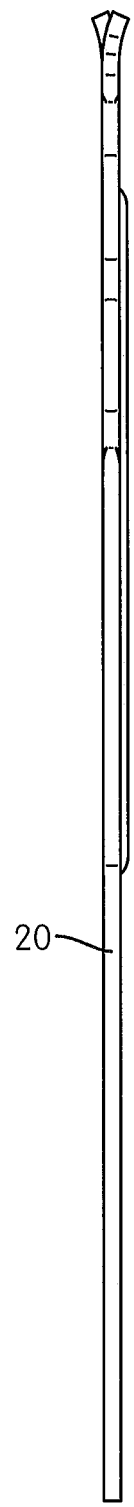
Figure 14C:
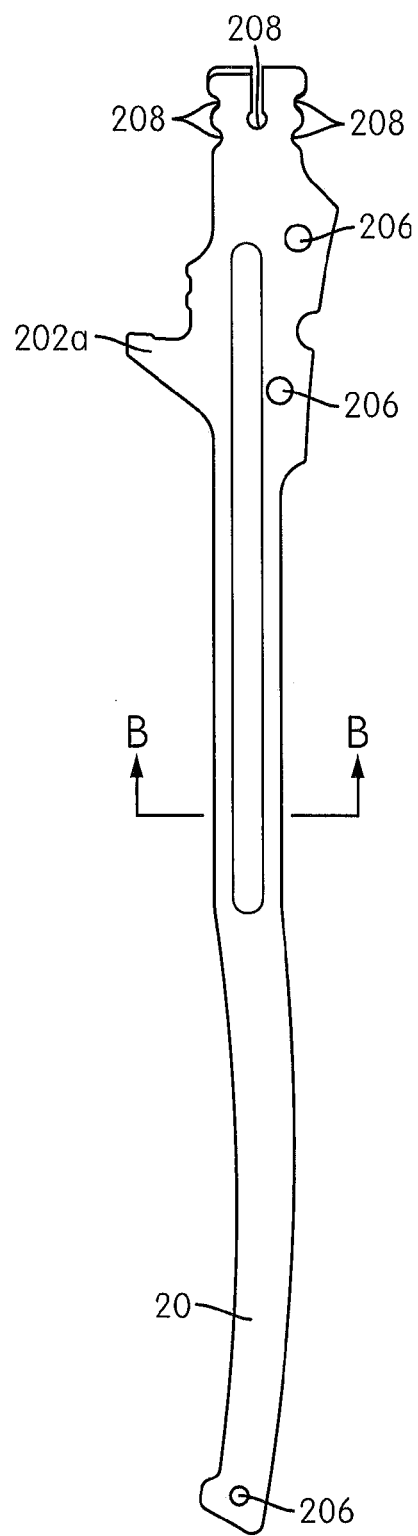
Figure 14D:
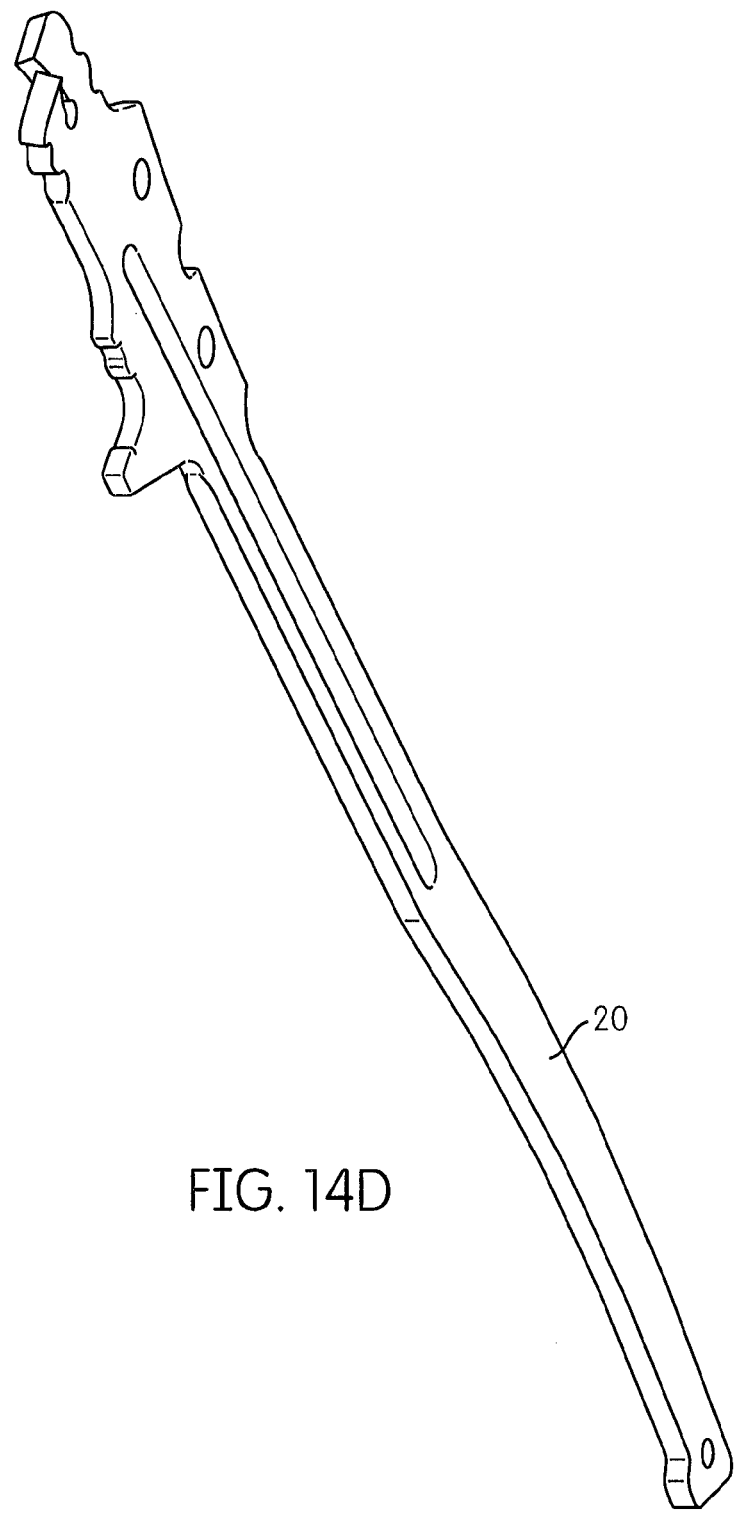
Figure 14E:
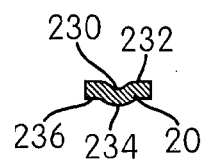

First, the core member 20 of the handle 12 is formed using, for example, a forging operation, stamping operation, casting operation or metal injection molding operation. In one embodiment, the core member 20 of the handle 12 is made from a fiberglass material or any other durable material. FIG. 13 shows an exemplary core member in accordance with an embodiment of the present application. FIGS. 14A-E show various views of this exemplary core member showing portions and dimensions of the core member.

Referring to FIGS. 8, 13, and 14A-E, the core member 20 has shallow cuts or protrusions 202, 204, and 206 formed on each end thereof. These shallow cuts or protrusions 202, 204, and 206 provide a mechanical interface for the rigid material layer 22. Also, additional cuts 208 are formed on the upper region of the core member 20. These cuts 208 enable a mechanical bond to be formed between the core member 20 and the epoxy resin material 36.

Figure 15:
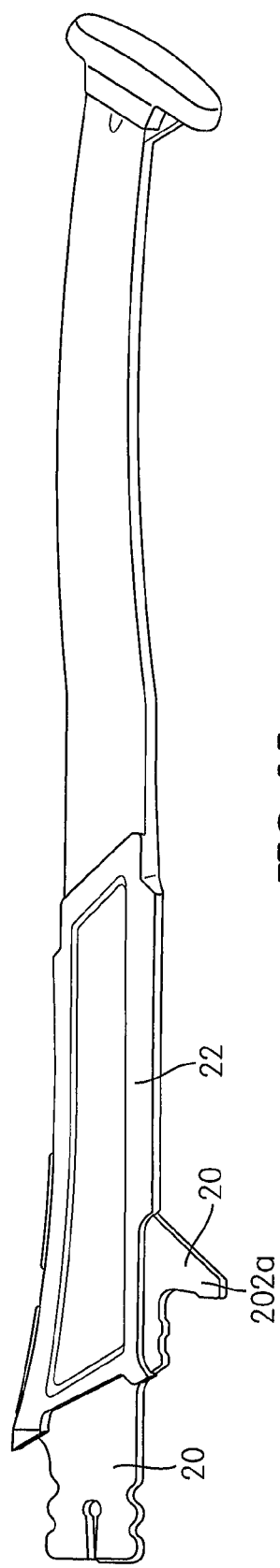
FIG. 15 shows a left hand side elevational view of the core member with a rigid material layer overmolded thereon in accordance with an embodiment of the present application.
Figure 16A:
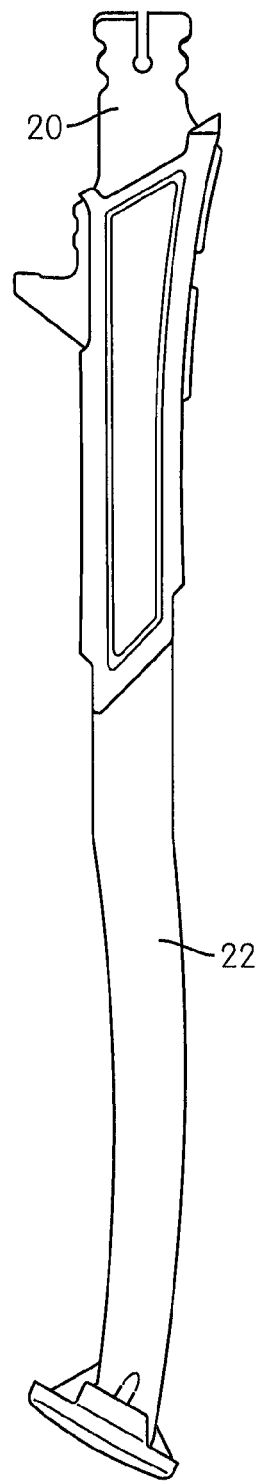
FIGS. 16A-F show various views of the core member of FIG. 15 showing portions and dimensions of the rigid material layer in accordance with an embodiment of the present application.
Figure 16B:
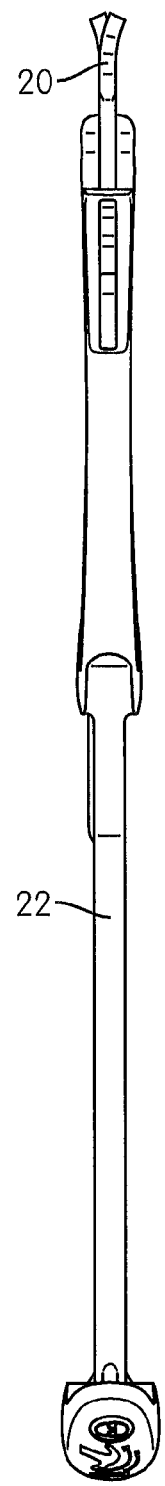
Figure 16C:
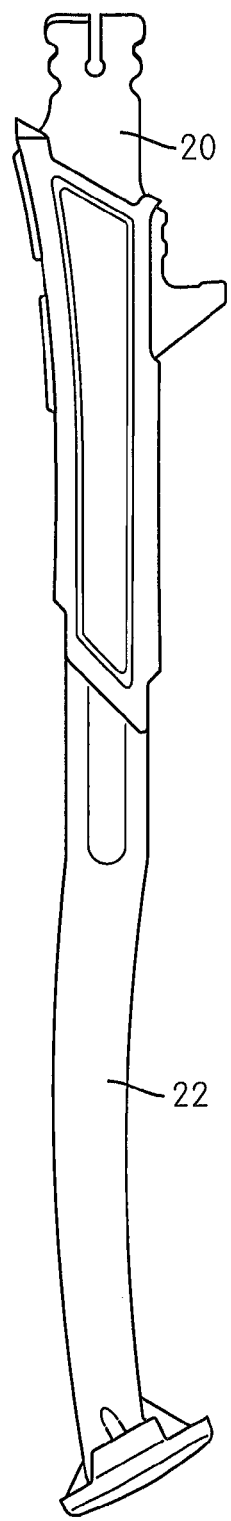
Figure 16D:
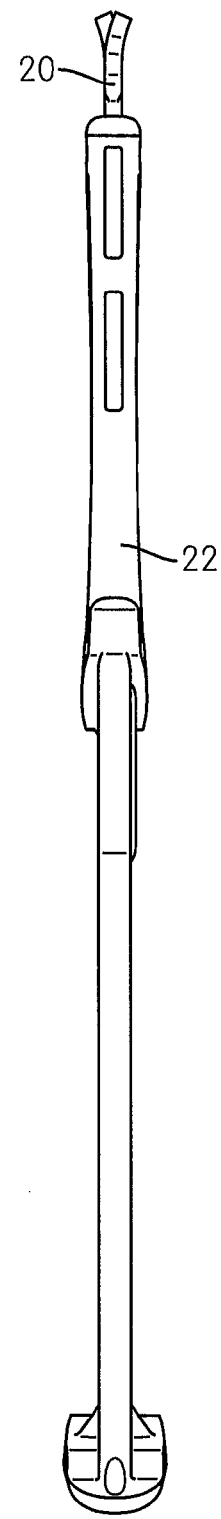
Figure 16E:
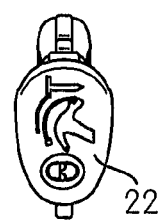
Figure 16F:
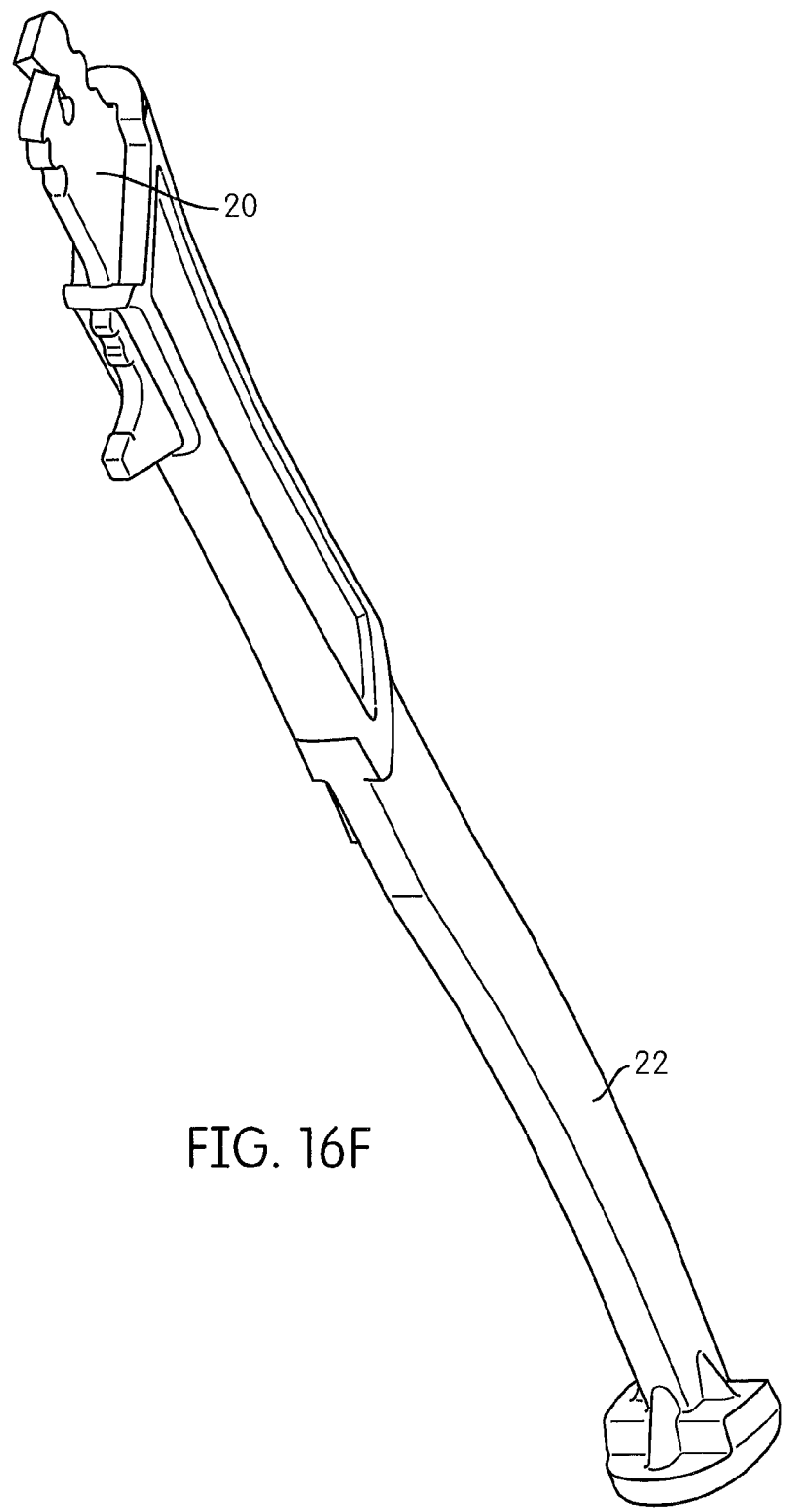
Figure 18A:
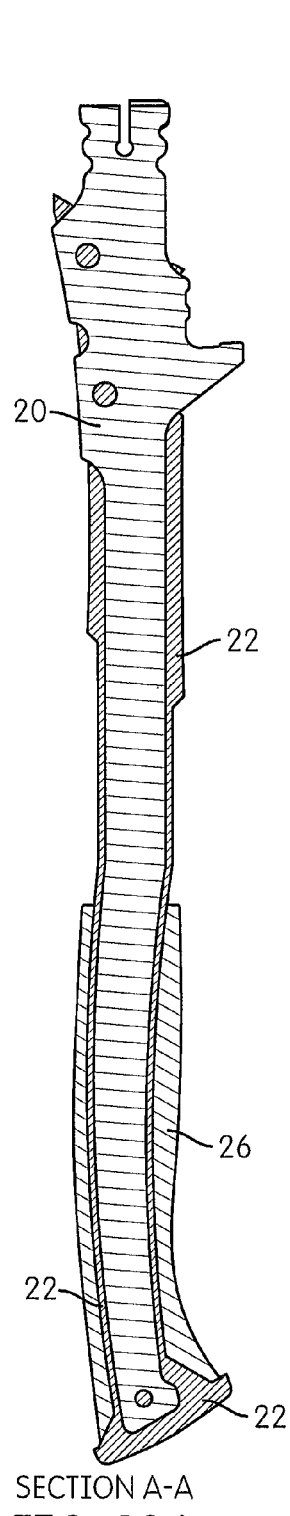
FIGS. 18A-D show various views of the core member of FIG. 17 showing portions of the rigid material layer and the first elastomeric material layer in accordance with an embodiment of the present application.
Figure 18B:
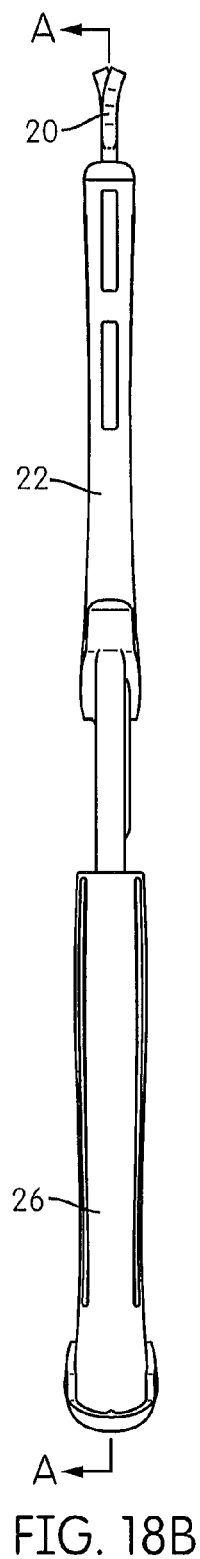
Figure 18C:
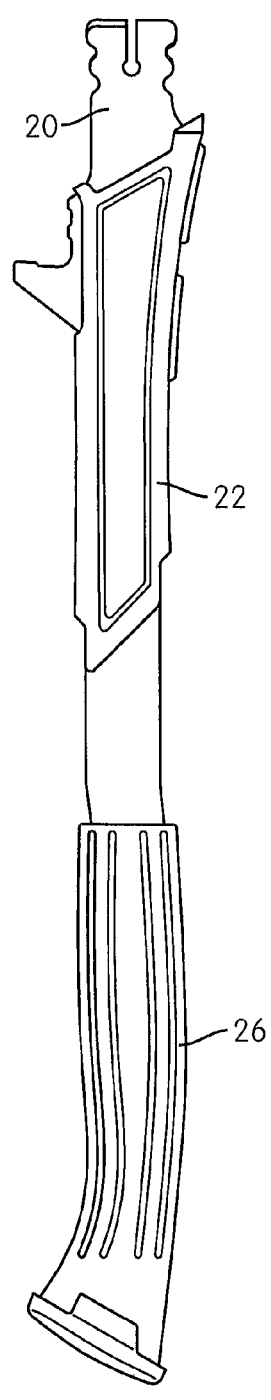
Figure 18D:
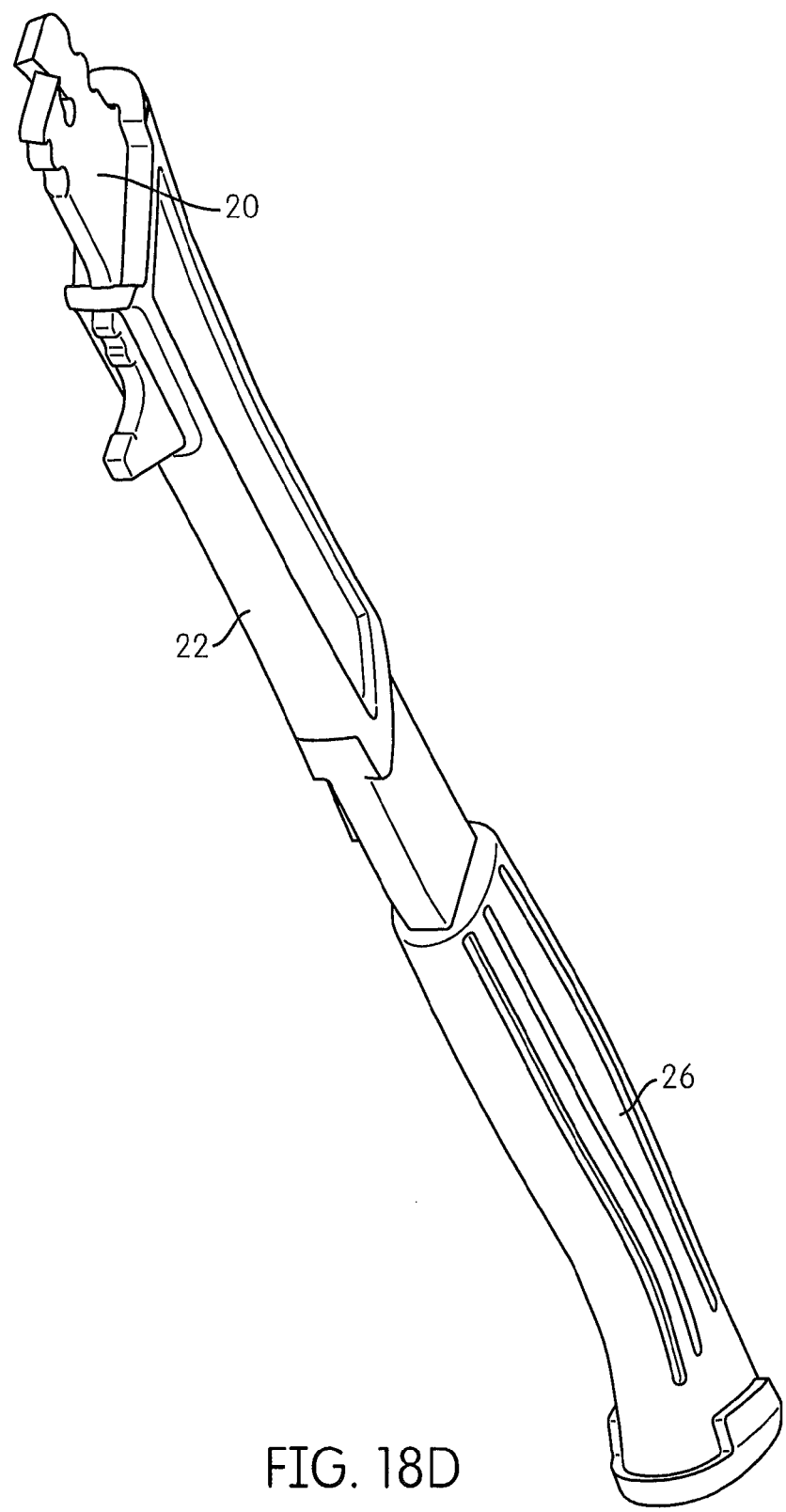

The rigid material layer 22 is first overmolded onto the core member 20 of the handle 12, for example, using an injection molding process. In one embodiment, the rigid material layer 22 that is overmolded onto the core member 20 of the handle 12 is made from a high impact plastic material. Properties of exemplary materials of the rigid material layer 22 are discussed above. FIG. 15 shows the exemplary core member 20 with the rigid material layer 22 overmolded thereon in accordance with an embodiment of the present application. FIGS. 16A-F show various views of the core member of FIG. 15 showing portions and dimensions of the rigid material layer.

The shallow cuts or protrusions 202, 204, and 206 of the core member 20 provide a mechanical interface for the rigid material layer 22.

The grip member 24 having the first elastomeric material layer 26 and the second elastomeric material 28 is then molded on at least a portion of the rigid material layer 22. In one embodiment, as shown in FIG. 8, the grip member 24 molded on the rigid material layer 22 in the handle grip region R. The first elastomeric material layer 26 is a different material from the second elastomeric material layer 28. FIG. 17 shows the core member with the rigid material layer and a first elastomeric material layer overmolded thereon in accordance with an embodiment of the present application. FIGS. 18A-D show various views of the core member of FIG. 17 showing portions of the rigid material layer and the first elastomeric material layer.

In one embodiment, the first elastomeric material layer 26 is first molded over the rigid material layer 22 using an injection molding process. Referring to FIG. 10, the plurality of circumferentially disposed notches 240 are formed on the surface 242 of the first elastomeric material layer 26.

Figure 19:
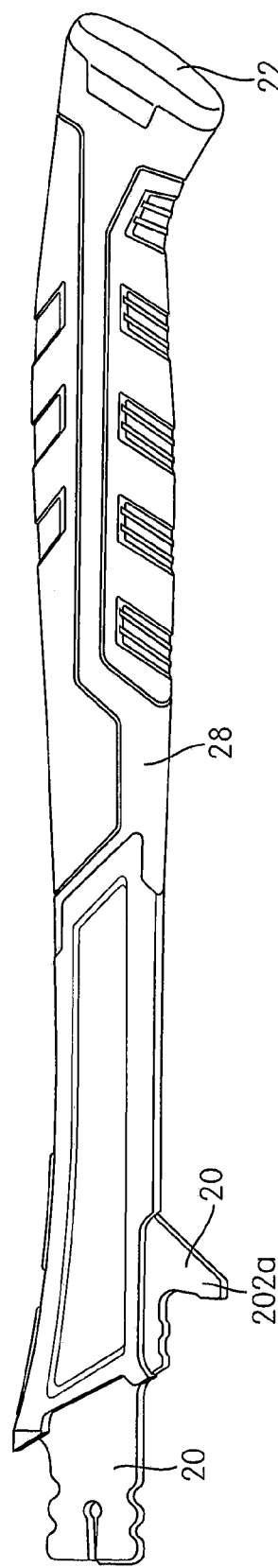
FIG. 19 shows a left hand side elevational view of the core member with the rigid material layer, the first elastomeric material layer and a second elastomeric material layer overmolded thereon in accordance with an embodiment of the present application.
Figure 20A:
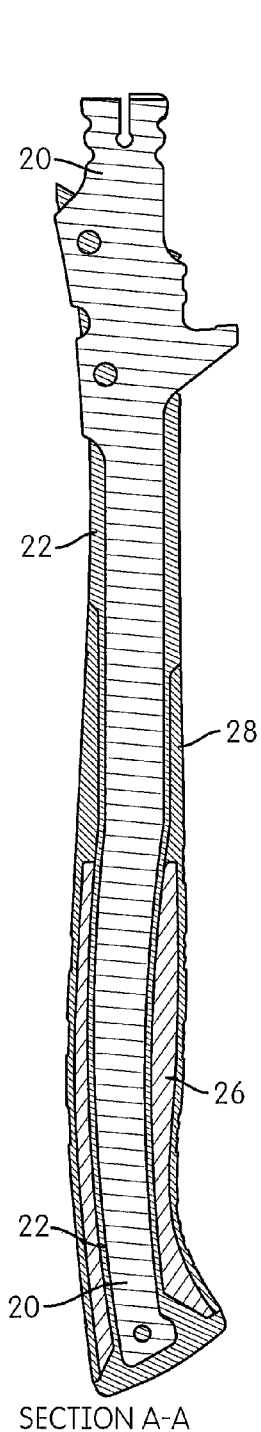
FIGS. 20A-E show various views of the core member of FIG. 19 showing portions of the rigid material layer, the first elastomeric material layer and the second elastomeric material layer in accordance with an embodiment of the present application.
Figure 20B:
Figure 20C:
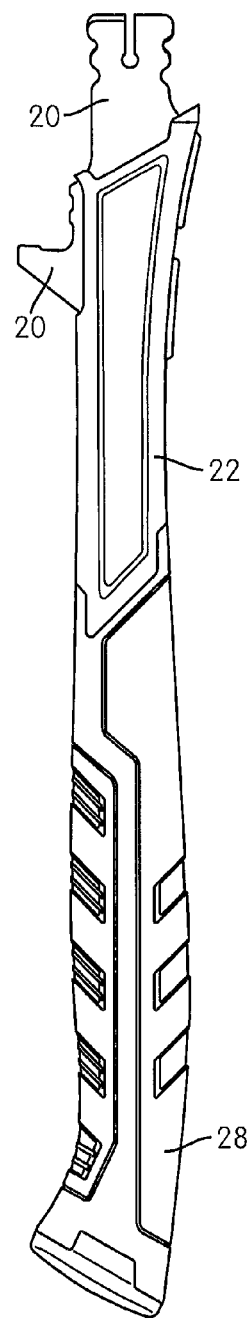
Figure 20D:
Figure 20E:
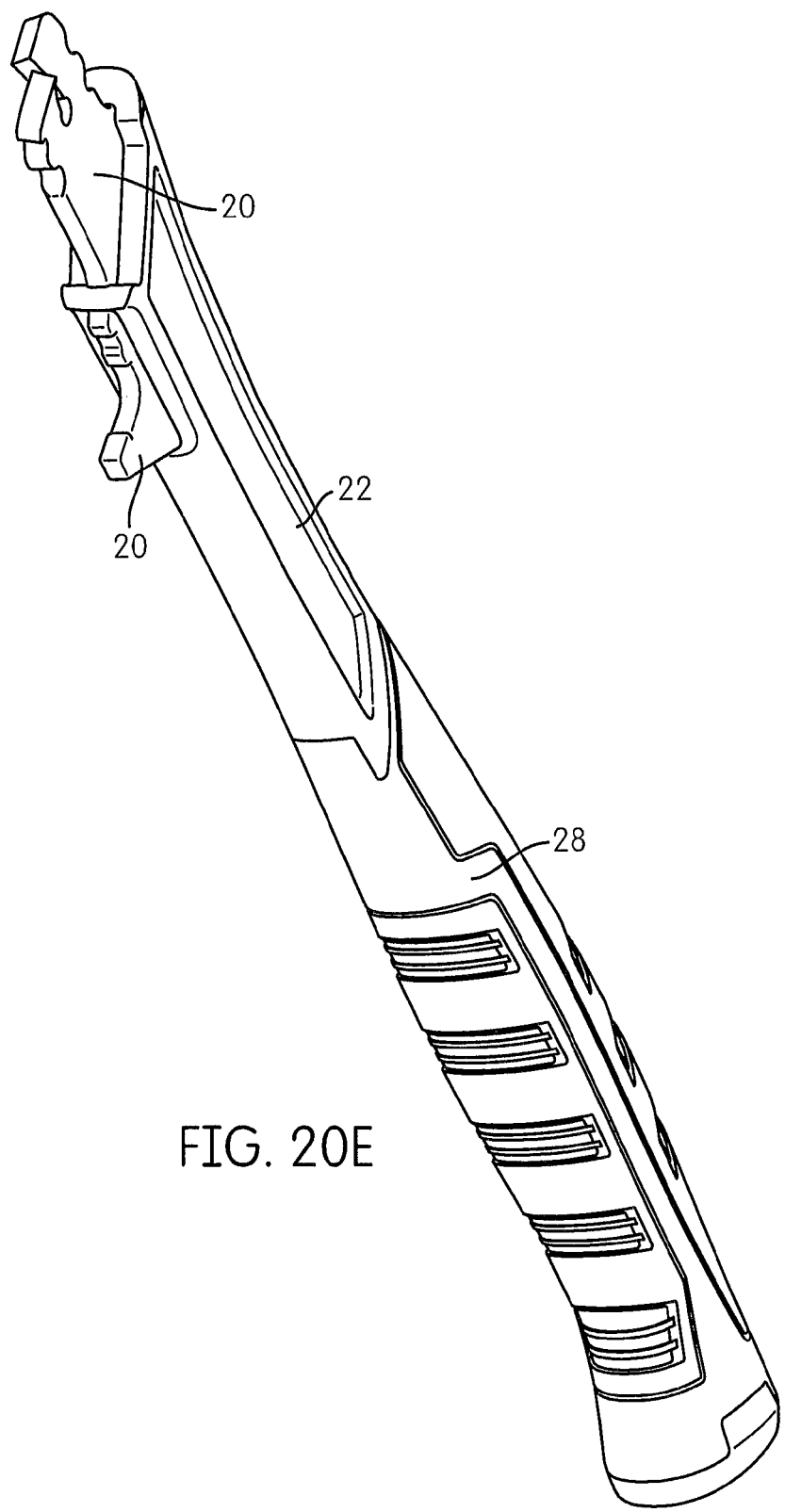

In one embodiment, the second elastomeric material layer 28 is then molded over the first elastomeric material layer 26 using an injection molding process. As noted above, during the overmolding of the second elastomeric material layer 28 on the first elastomeric material layer 26, the circumferentially positioned notches 240 receive some material of the second elastomeric material layer 28 to form mechanical interlock regions for the second elastomeric material layer 28 to take hold of the first elastomeric material layer 26. FIG. 19 shows the core member 20 with the rigid material layer 22, the first elastomeric material layer 26 and the second elastomeric material layer 28 overmolded thereon in accordance with an embodiment of the present application. FIGS. 20A-E show various views of the core member of FIG. 19 showing portions of the rigid material layer 22, the first elastomeric material layer 26 and the second elastomeric material layer 28.

The elastomeric portion 34 is then overmolded onto the core member 20 in the head and handle compliant portion CP. In one embodiment, as shown in FIG. 9, a surface portion 211 of the core member 20 includes a protruding portion 209 and a recessed portion 213 constructed and arranged to enable a mechanical bond to be formed between the core member 20 and the elastomeric portion 34. The elastomeric portion 34 is positioned within the eye portion 30 and at least partially disposed between the handle 12 and the head 14. In one embodiment, the elastomeric portion 34 is constructed and arranged to cover at least half of the portion of the core member 20 of the handle 12 that is not overmolded with the rigid material layer 22.

Figure 21:
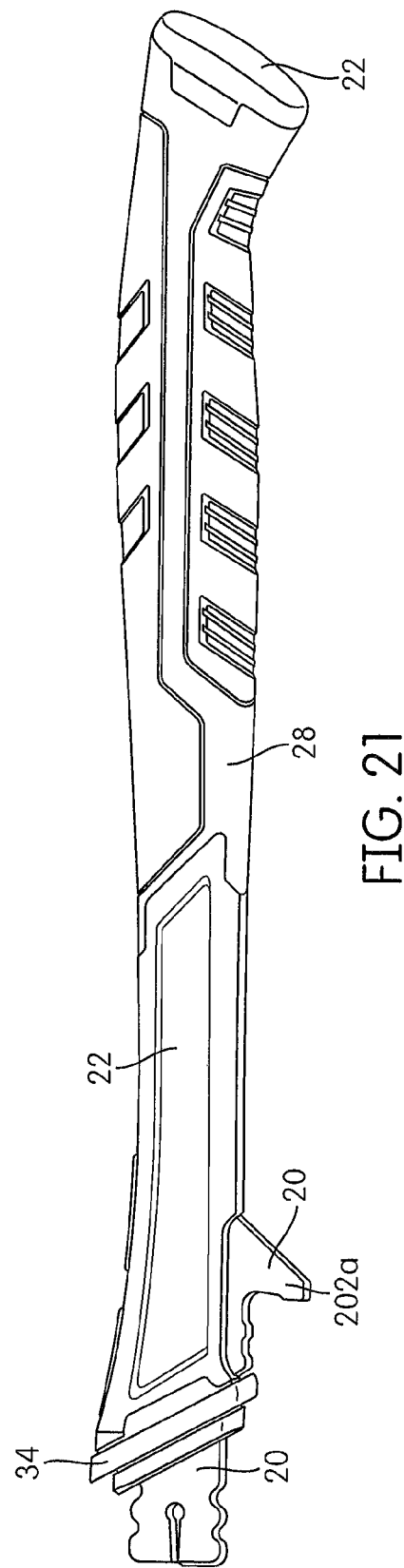
FIG. 21 shows a left hand side elevational view of the core member with the rigid material layer, the first elastomeric material layer, the second elastomeric material layer and an elastomeric portion overmolded thereon in accordance with an embodiment of the present application.
Figure 22A:
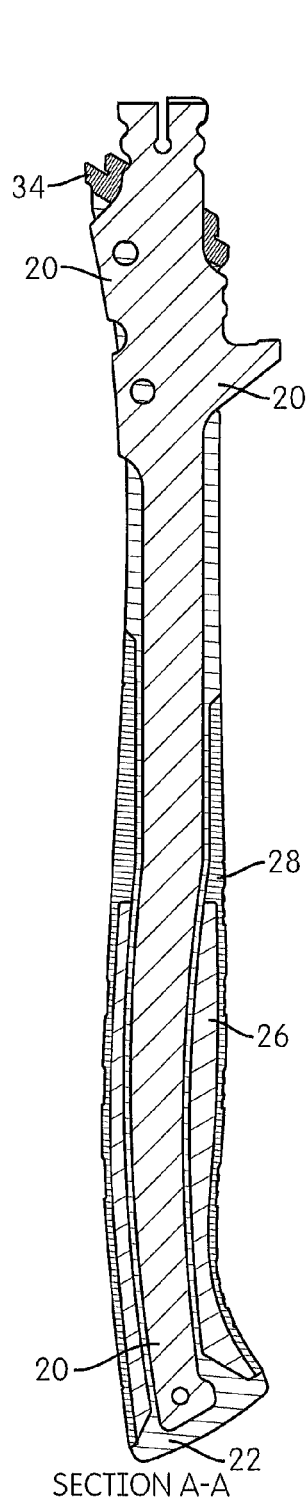
FIGS. 22A-E show various views of the core member of FIG. 21 showing portions of the rigid material layer, the first elastomeric material layer, the second elastomeric material layer and the elastomeric portion in accordance with an embodiment of the present application.
Figure 22B:
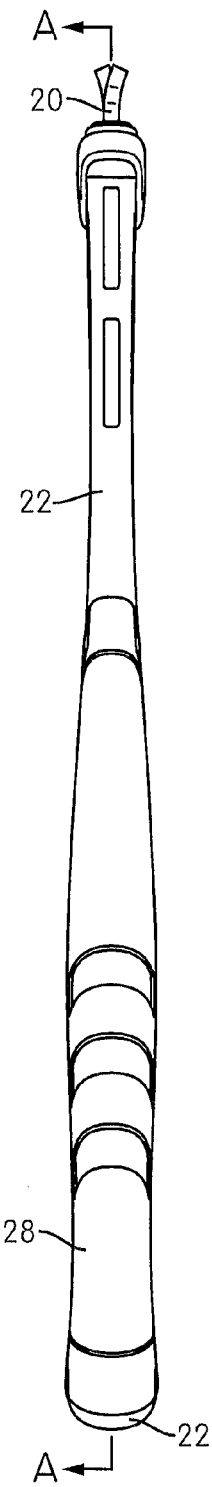
Figure 22C:
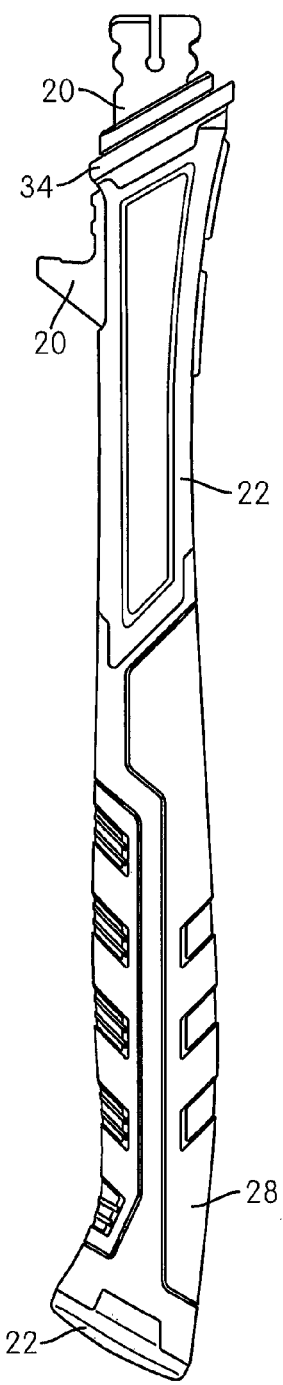
Figures 22D, 22E:
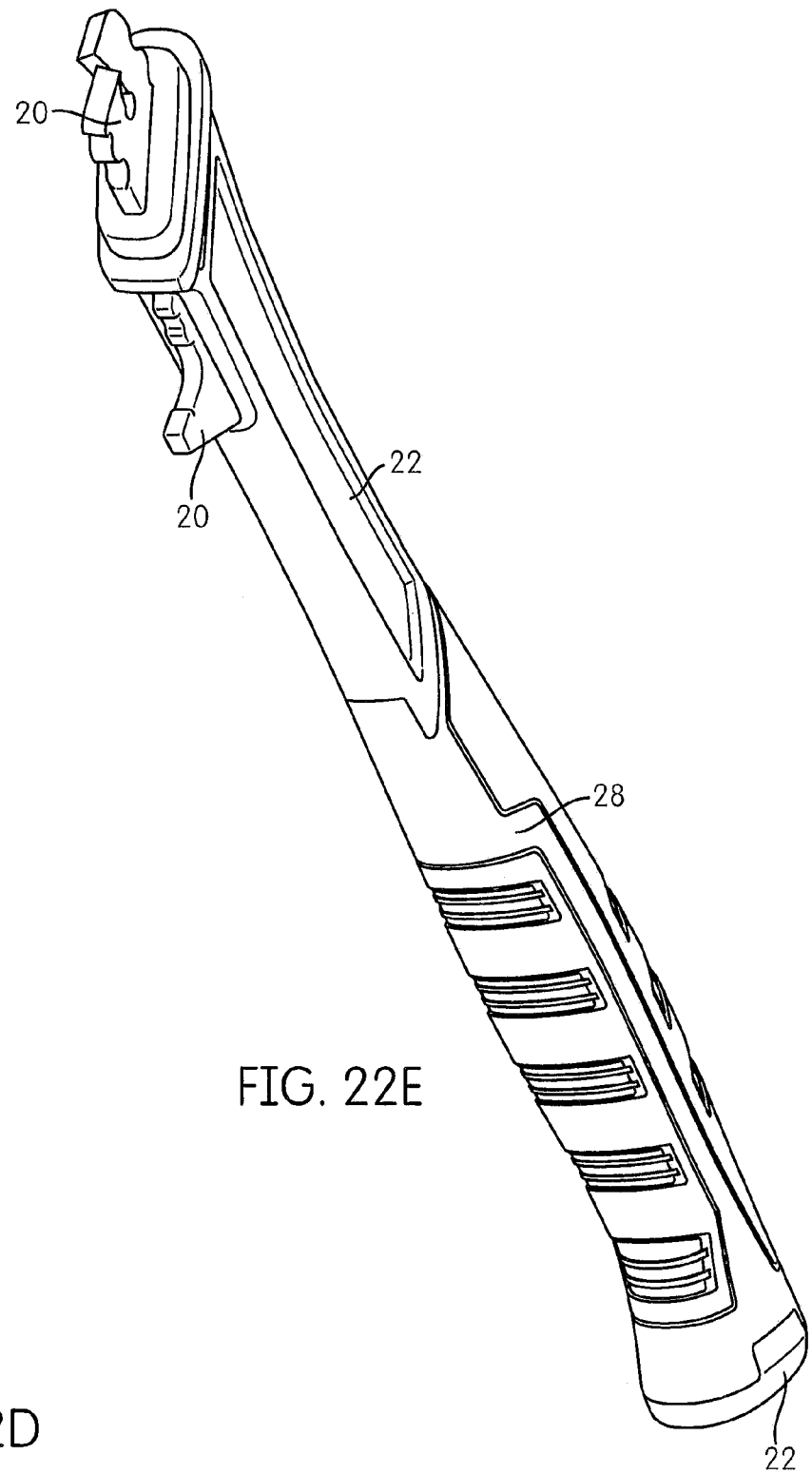

FIG. 21 shows the core member 20 with the rigid material layer 22; the first elastomeric material layer 26, the second elastomeric material layer 28 and the elastomeric portion 34 overmolded thereon in accordance with an embodiment of the present application. FIGS. 22A-E show various views of the core member of FIG. 21 showing portions of the rigid material layer 22, the first elastomeric material layer 26, the second elastomeric material layer 28 and the elastomeric portion 34.

Figure 23A:
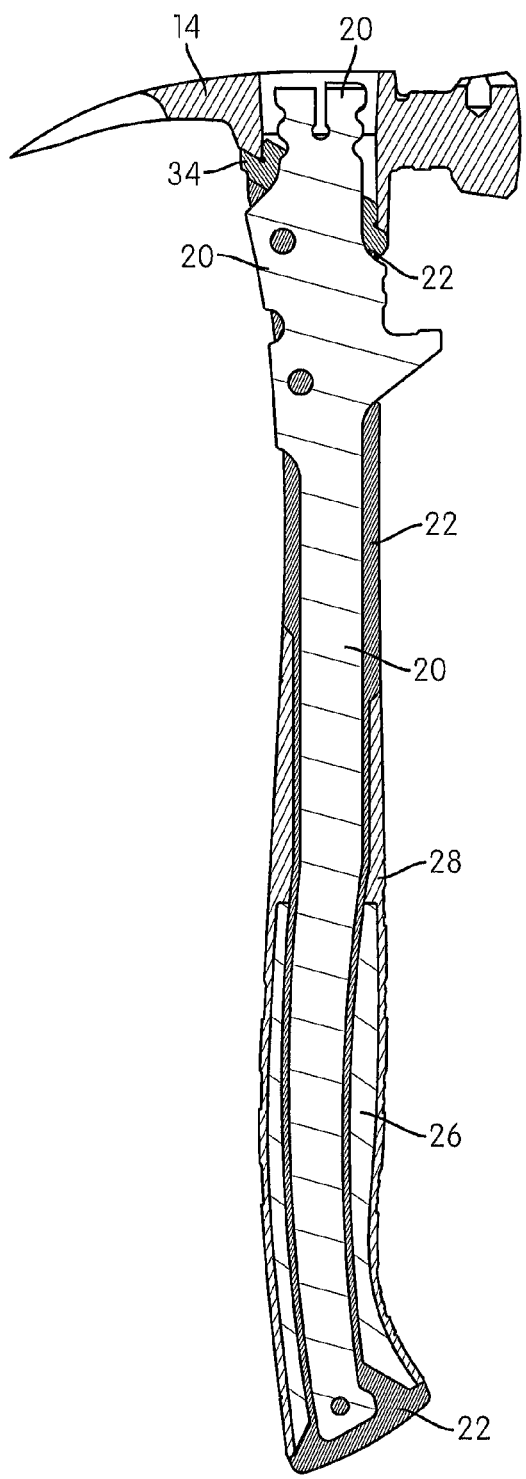
FIGS. 23A-C show various views in which the handle (with the rigid material layer, the first elastomeric material layer, the second elastomeric material layer and the elastomeric portion overmolded thereon) is inserted into an eye of the head before providing an epoxy resin material to secure the handle to the head in accordance with an embodiment of the present application.
Figure 23B:
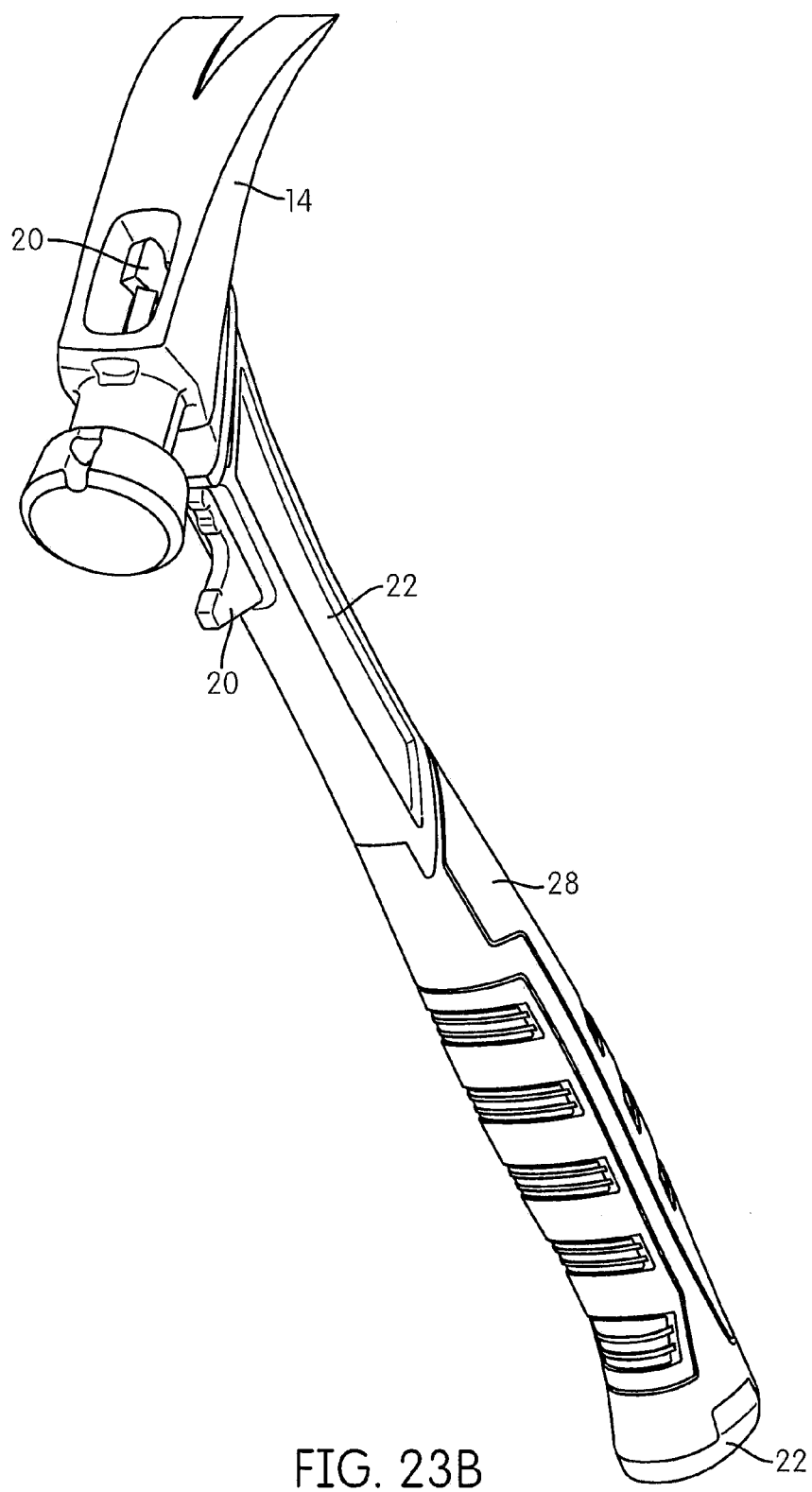
Figure 23C:
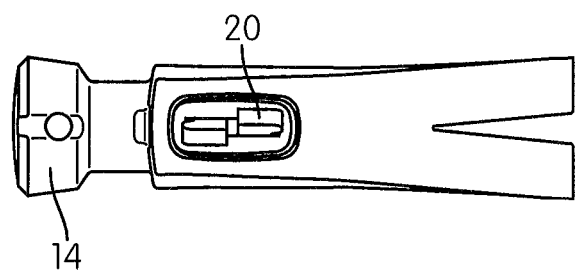

FIGS. 23A-C show various views in which the handle 12 (with the rigid material layer 22, the first elastomeric material layer 26, the second elastomeric material layer 28 and the elastomeric portion 34 overmolded thereon) is inserted into an eye of the head 14 but before providing the epoxy resin material 36 to secure the handle 12 to the head 14. In order to further secure the handle 12 within the eye portion 30, the epoxy resin material 36 is injected to fill the head and handle interface portion IP. As shown in FIG. 9, the head and handle interface portion IP has upper side surface portions 227 of the head and handle compliant portion CP or the elastomeric portion 34 on its lower side 228a. The epoxy resin material 36, which is injected to fill the head and handle interface portion IP, is thus retained by the surfaces 227, by surfaces 217 of the head 14, and by the surfaces 219 and 221 of the core member 20. The epoxy resin material 36 later solidifies in the head and handle interface portion IP to secure the handle 12 to the head 14.

Referring to FIG. 9, the outer surface 231 of the elastomeric portion 34 forms a secure press fit with the eye portion 30 to avoid any leakage of the epoxy resin material 36 out the space between the eye portion 30 and the handle 12. Specifically, the elastomeric portion 34 is first overmolded onto the core member 20 (in the head and handle compliant portion CP), and the epoxy resin material 36 is then injected into one end of the eye portion to fill the head and handle interface portion IP. The elastomeric portion 34 acts as a seal to prevent any leakage of the epoxy resin material 36 through an opposite end of the eye portion 30.

The portions and dimensions of various parts of the hammer shown in FIGS. 14A-E, 16A-F, 18A-D, 20A-E, and 22A-E are intended to be merely exemplary and not limiting in anyway. The various parts of the hammer shown in FIGS. 14A-E, 16A-F, 18A-D, 20A-E, and 22A-E are drawn to scale in accordance with one embodiment, although other scales and shapes may be used in other embodiments. The dimensions of various parts of the hammer as shown in FIGS. 14A-E, 16A-F, 18A-D, 20A-E, and 22A-E are measured in inches.

Although the application has been described in detail for the purpose of illustration, it is to be understood that such detail is solely for that purpose and that the application is not limited to the disclosed embodiments, but, on the contrary, is intended to cover modifications and equivalent arrangements that are within the spirit and scope of the appended claims. In addition, it is to be understood that the present application contemplates that, to the extent possible, one or more features of any embodiment can be combined with one or more features of any other embodiment.

What is claimed is:

1. A hammer comprising:
    a handle having a bottom end and an upper end;
    a head disposed on the upper end of the handle and having an eye portion extending through the head, the handle having at least a portion of its upper end extending into the eye portion;
    an epoxy resin material positioned within the eye portion and being at least partially disposed between the handle and the head to secure the handle to the head; and
    an elastomeric portion at least partially disposed between the handle and the head,
    wherein the eye portion includes a circumferential inner surface, and wherein a bottom of the head comprises a lower annular surface portion joining with a lower portion of the circumferential inner surface, and
    wherein the elastomeric portion is constructed and arranged to engage with the lower annular surface portion and the circumferential inner surface.

2. The hammer of claim 1, wherein the handle and the head are separately formed structures.

3. The hammer of claim 2, wherein the handle comprises a core member; a rigid material layer molded on the core member; and a grip member molded on at least a portion of the rigid material layer, wherein the grip member comprises a first elastomeric material layer molded on the rigid material layer and a second elastomeric material molded on the first elastomeric material layer and wherein the first elastomeric material layer is a different material from the second elastomeric material layer.

4. The hammer of claim 3, wherein a Shore A durometer of the first elastomeric material layer is lower than a Shore A durometer of the second elastomeric material layer.

5. The hammer of claim 4, wherein the first elastomeric material is a soft rubber material having a Shore A durometer of about 20 to about 60.

6. The hammer of claim 4, wherein the second elastomeric material is a hard rubber material having a Shore A durometer of about 60 to about 80.

7. The hammer of claim 3, wherein the core member is made of a fiberglass material.

8. The hammer of claim 3, wherein the rigid material layer is a hard impact plastic material having a Shore D durometer of about 65 to about 90.

9. The hammer of claim 3, wherein the rigid material layer is a polypropylene material.

10. The hammer of claim 3, wherein the rigid material layer is formed between the core member and an annular bottom surface of the elastomeric portion.

11. The hammer of claim 3, wherein the epoxy resin material and the elastomeric portion are configured to be in direct contact with core member.

12. The hammer of claim 3, wherein the elastomeric portion is configured to be in direct contact with the epoxy resin material and in direct contact with the core member.

13. The hammer of claim 1, wherein the elastomeric portion is made from a hard rubber material having a Shore A durometer of about 50 to about 90.

14. The hammer of claim 1, wherein the epoxy resin material is a chemically cured, two part epoxy material.

15. The hammer of claim 1, wherein the elastomeric portion has a Shore A durometer of about 60 to about 80.

16. The hammer of claim 1, wherein the epoxy resin material has a Shore D durometer of about 60 to about 90.

17. The hammer of claim 1, wherein the elastomeric portion is constructed and arranged to engage with entirety of the lower annular surface portion at forward portion of the lower annular surface portion aligned with the head.

18. A hammer comprising:
    a handle having a bottom end and an upper end;
    a head disposed on the upper end of the handle and having an eye portion extending through the head, the handle having at least a portion of its upper end extending into the eye portion;
    an epoxy resin material positioned within the eye portion and being at least partially disposed between the handle and the head to secure the handle to the head; and
    an elastomeric portion at least partially disposed between the handle and the head,
    wherein the handle and the head are separately formed structures,
    wherein an entire length of a core member, except a portion of the core member at a head and handle interface portion that is at the eye portion and a portion of the core member at a head and handle compliant portion that is at least partially disposed at the eye portion, is overmolded with the rigid material layer.

19. The hammer of claim 18, wherein the elastomeric portion is overmolded on the core member at the head and handle compliant portion.

20. The hammer of claim 18, wherein the elastomeric portion is constructed and arranged to create a compliant interface between the handle and the head in the head and handle compliant portion at the eye portion.

21. The hammer of claim 20, wherein the elastomeric portion is constructed and arranged to isolate the core member from the head with the complaint interface and to reduce the amount of vibration transmitted from the head to the handle.

22. The hammer of claim 18, wherein the epoxy resin material is disposed in the head and handle interface portion between the handle and the head to secure the handle to the head.

* * * * *